(12) United States Patent
Park et al.

(10) Patent No.: US 10,948,925 B2
(45) Date of Patent: Mar. 16, 2021

(54) ELECTRONIC DEVICE, EXTERNAL SERVER, AND METHOD FOR CONTROLLING SAME

(71) Applicant: SAMSUNG ELECTRONICS CO., LTD., Suwon-si (KR)

(72) Inventors: Chan-Ju Park, Seoul (KR); Jun-Ik Jang, Bucheon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 169 days.

(21) Appl. No.: 16/307,304

(22) PCT Filed: May 30, 2017

(86) PCT No.: PCT/KR2017/005627
§ 371 (c)(1),
(2) Date: Dec. 5, 2018

(87) PCT Pub. No.: WO2017/213373
PCT Pub. Date: Dec. 14, 2017

(65) Prior Publication Data
US 2019/0138026 A1 May 9, 2019

(30) Foreign Application Priority Data

Jun. 8, 2016 (KR) .................. 10-2016-0070887

(51) Int. Cl.
*G05D 1/02* (2020.01)
*G01C 21/00* (2006.01)
(Continued)

(52) U.S. Cl.
CPC .......... *G05D 1/0274* (2013.01); *G01C 21/00* (2013.01); *G05D 1/027* (2013.01); *G05D 1/0238* (2013.01);
(Continued)

(58) Field of Classification Search
CPC .. G05D 1/0274; G05D 1/0282; G05D 1/0248; G05D 1/0238; G05D 1/0253;
(Continued)

(56) References Cited

U.S. PATENT DOCUMENTS 8,386,078 B1 2/2013 Hickman et al.
8,396,254 B1 3/2013 Hickman
(Continued)

FOREIGN PATENT DOCUMENTS

KR           10-1100827          1/2012
KR        10-2012-0033414        4/2012
(Continued)

OTHER PUBLICATIONS

Extended Search Report dated May 24, 2019 in counterpart European Patent Application No. 17810496.4.
(Continued)

*Primary Examiner* — Jaime Figueroa
(74) *Attorney, Agent, or Firm* — Nixon & Vanderhye, P.C.

(57) ABSTRACT

Disclosed is an electronic device. An electronic device according to one embodiment may comprise: a communication module; a sensor module which acquires movement information of the electronic device and image information of the place where the electronic device is moving; a memory which stores space information corresponding to the place where the electronic device is moving; and a processor which uses the movement information and space information to determine a plurality of first candidate locations, within the place, corresponding to the electronic device, and then, on the basis of the image information and the plurality of first candidate locations, determines whether the location accuracy corresponding to the plurality of first candidate locations is smaller than a valid value, and, on the
(Continued)

basis of the result of the determination, uses the electronic device or an external server to acquire at least one second candidate location from among the plurality of first candidate locations, and uses the acquired at least one second candidate location to determine an estimated location for the electronic device.

18 Claims, 22 Drawing Sheets

(51) Int. Cl.
    *G06T 7/579*     (2017.01)
    *G06K 9/00*     (2006.01)

(52) U.S. Cl.
    CPC ......... *G05D 1/0248* (2013.01); *G05D 1/0253* (2013.01); *G05D 1/0282* (2013.01); *G06K 9/00201* (2013.01); *G06T 7/579* (2017.01); *G06T 2207/10016* (2013.01); *G06T 2207/30252* (2013.01)

(58) Field of Classification Search
    CPC ........ G05D 1/027; G01C 21/00; G06T 7/579; G06T 2207/10016; G06T 2207/30252; G06K 9/00201
    USPC .......................................... 700/245
    See application file for complete search history.

(56) References Cited

U.S. PATENT DOCUMENTS

| | | | | |
|---|---|---|---|---|
| 8,712,686 B2* | 4/2014 | Bandyopadhyay | ... | H04W 4/029 701/446 |
| 8,751,151 B2* | 6/2014 | Funk | ..................... | G01C 21/206 701/409 |
| 8,989,053 B1* | 3/2015 | Skaaksrud | ............ | H04W 52/04 370/255 |
| 10,352,707 B2* | 7/2019 | Kordari | ................. | G01C 21/206 |
| 2004/0028258 A1* | 2/2004 | Naimark | ............... | G06K 9/4609 382/103 |
| 2005/0234679 A1 | 10/2005 | Karlsson | | |
| 2010/0152945 A1 | 6/2010 | Park et al. | | |
| 2012/0081248 A1* | 4/2012 | Kennedy | ................ | G01S 5/0289 342/118 |
| 2012/0089295 A1 | 4/2012 | Ahn et al. | | |
| 2012/0213443 A1 | 8/2012 | Shin et al. | | |
| 2013/0332064 A1* | 12/2013 | Funk | ....................... | G01C 21/00 701/409 |
| 2013/0332065 A1* | 12/2013 | Hakim | .................. | G01C 21/206 701/411 |
| 2015/0304634 A1* | 10/2015 | Karvounis | ......... | G06K 9/00201 348/46 |
| 2015/0347959 A1* | 12/2015 | Skaaksrud | ............ | H04W 52/40 705/333 |
| 2016/0129593 A1* | 5/2016 | Wolowelsky | ........ | G05D 1/0274 700/253 |
| 2016/0353238 A1* | 12/2016 | Gherardi | .................. | H04B 1/69 |
| 2016/0371394 A1* | 12/2016 | Shahidi | ................. | G01S 5/0252 |

FOREIGN PATENT DOCUMENTS

| | | |
|---|---|---|
| KR | 10-1379211 | 4/2014 |
| KR | 10-1468545 | 12/2014 |
| KR | 10-1493075 | 2/2015 |

OTHER PUBLICATIONS

Riazuelo, L. et al. "C2TAM: A Cloud Framework for Cooperative Tracking and Mapping," Robotics and Autonomous Systems 62 (2014); pp. 401-413.

International Search Report for PCT/KR2017/005627, dated Aug. 18, 2017, 4 pages.

Written Opinion of the ISA for PCT/KR2017/005627, dated Aug. 18, 2017, 7 pages.

* cited by examiner

ELECTRONIC DEVICE, EXTERNAL SERVER, AND METHOD FOR CONTROLLING SAME This application is a National Phase Entry of PCT International Application No. PCT/KR2017/005627, which was filed on May 30, 2017 and claims priority under 35 U.S.C. § 119 of Korean Patent Application No. 10-2016-0070887, filed on Jun. 8, 2016, in the Korean Intellectual Property Office, the disclosure of each of which is incorporated herein by reference in its entirety.

TECHNICAL FIELD

The present invention relates to an electronic device, an external server, and a control method therefor, and, more specifically, to a method for simultaneous localization and map-building for an electronic device.

BACKGROUND

Recently, techniques for robot apparatuses capable of performing preset functions while moving indoors independently and without a user's special manipulation with respect to them have been disclosed.

In this case, a robot apparatus moves indoors by using a wheel provided therewith, by statistically/stochastically estimating its location in an indoor space continuously while moving, and by building a map of the indoor space using indoor information about the periphery of the estimated location.

As such, a simultaneous localization and map-building (SLAM) technique has been proposed by which the robot apparatus estimates its location in real time while moving indoors independently and builds a map of the indoor space including the estimated location.

SUMMARY

As described above, a conventional robot apparatus estimates a plurality of candidate locations (e.g., particles), which are candidates for the current location of the robot apparatus, by using the SLAM technique, continuously corrects the plurality of candidate locations, and finally selects a minimum amount of candidate locations in order to calculate a candidate location that is closest to the real location.

However, when calculating the candidate location, the robot apparatus may calculate valid candidate locations by using periphery information (e.g., an image detected in real time by the robot apparatus) currently acquired by the robot apparatus; however, a huge amount of computation is required to perform the calculation.

The disclosure is made to solve the foregoing or other problems, and may provide an effective method for calculating valid candidate locations for a robot apparatus in a fast and easy way.

According to various embodiments of the present disclosure, an electronic device may include a communication module, a sensor module configured to obtain movement information of the electronic device and image information of a place where the electronic device moves, a memory having stored therein space information corresponding to the place where the electronic device moves, and a processor configured to determine a plurality of first candidate locations corresponding to the electronic device in the place using the movement information and the space information, in order to determine, based on the image information and the plurality of first candidate locations, whether location accuracies corresponding to the plurality of first candidate locations are smaller than a valid value, to obtain at least one second candidate location from among the plurality of first candidate locations using any one of the electronic device and an external server based on a result of the determination, and to determine the estimated location of the electronic device by using the obtained at least one second candidate location.

According to various embodiments of the present disclosure, a server may include a communication unit configured to obtain movement information of a first electronic device and image information of a place where the first electronic device moves, a memory having stored therein space information corresponding to the place where the first electronic device moves, and a processor configured to receive a plurality of first candidate locations corresponding to the first electronic device from the first electronic device using the communication unit, in order to determine at least one second candidate location after obtaining a request for the at least one second candidate location among the plurality of first candidate location from the first electronic device, and to transmit the at least one second candidate location to the first electronic device.

Advantageous Effects

According to various embodiments of the present disclosure, a robot apparatus may send a request for calculation of a valid candidate location to a server, thereby reducing the amount of calculation performed in the robot apparatus.

Moreover, according to various embodiments of the present disclosure, the robot apparatus may send the request for calculation of the valid candidate location to the server only when necessary, based on a condition for the valid candidate location, thus preventing network instability and traffic delay between the server and the robot apparatus.

DETAILED DESCRIPTION

Figure 1:
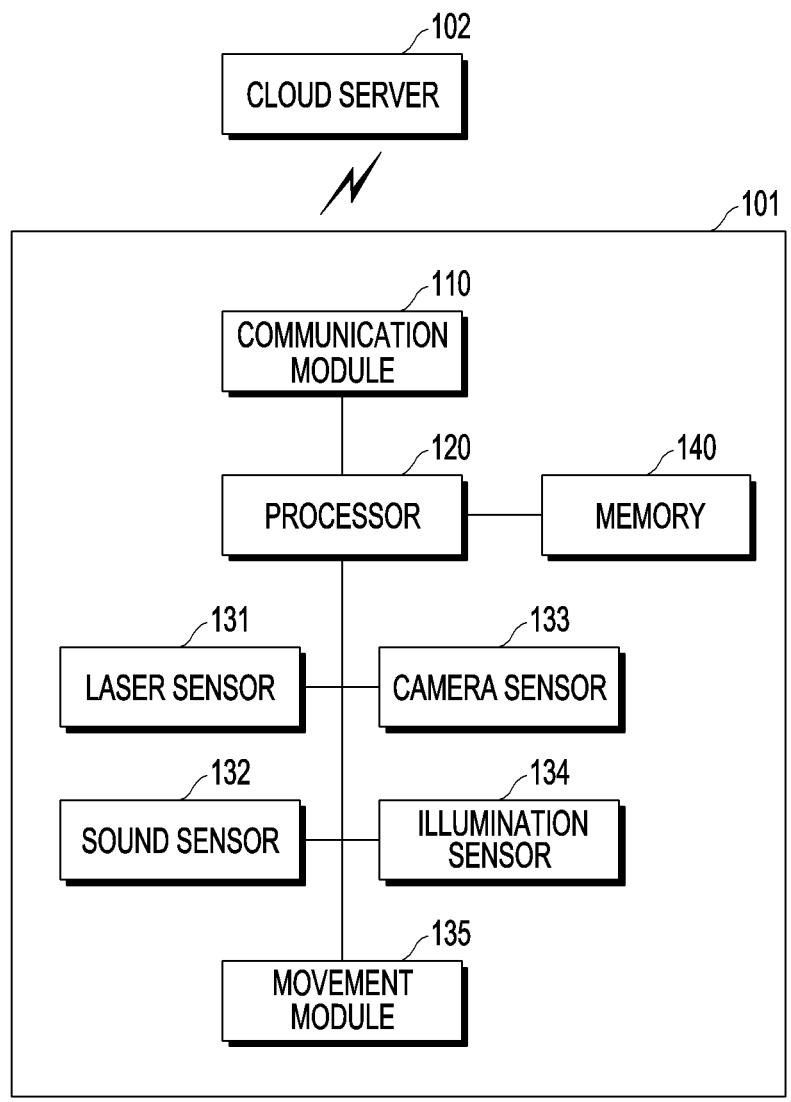
FIG. 1 is a block diagram of an electronic device and a network according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with a command stored in a computer-readable storage medium in the form of a programming module. When the instructions are executed by one or more processors, the one or more processors may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Hereinafter, referring to FIGS. 1 to 22, a description will be made of a method for determining an estimated location of an electronic device (simultaneous localization and map-building: SLAM) according to various embodiments.

FIG. 1 is a block diagram of an electronic device according to various embodiments.

As illustrated in FIG. 1, according to various embodiments, an electronic device 101 may include a communication module 110, a processor 120, a memory 140, a laser sensor 131, a sound sensor 132, a camera sensor 133, an illumination sensor 134, and/or a movement module 135.

According to various embodiments, the communication module 110 may transmit data to and receive data from a cloud server 102 that is an external server for the electronic device 101.

According to various embodiments, the laser sensor 131, the sound sensor 132, the camera sensor 133, and the illumination sensor 134 may be included in one sensor module.

According to various embodiments, the sensor module 131, 132, 133, and 134 may obtain movement information of the electronic device 101 and/or a sensing signal for a place where the electronic device 101 moves, using a sensing signal. For example, the laser sensor 131 may emit laser to the periphery of the electronic device 101 and obtain a reflected laser. The sound sensor 132 may output a sound to the periphery of the electronic device 101 and obtain reflected sound. The camera sensor 133 may capture an object in the periphery of the electronic device 101 and obtain image information. The illumination sensor 134 may obtain ambient light in the periphery of the electronic device 101.

According to various embodiments, the memory 140 may store space information (e.g., a map) corresponding to a place where the electronic device 101 moves.

According to various embodiments, the processor 120 may control components in the electronic device 101. For example, the processor 120 may receive a sensing signal (e.g., the reflected laser, the reflected sound, the image information, and the ambient light) obtained by the respective sensor modules 131, 132, 133, and 134 and obtain the movement information of the electronic device 101 based on the sensing signal. The processor 120 may determine a plurality of first candidate locations corresponding to the electronic device 101 using the space information stored in the memory 140 and the movement information of the electronic device 101. The processor 120 may obtain, from among the plurality of first candidate locations, at least one second candidate location based on the sensing signal (e.g., the image information) according to a preset condition (e.g., uncertainty information about the plurality of first candidate locations) using the electronic device 101 and/or the cloud server 102. The processor 120 may determine the estimated location of the electronic device 101 using the at least one second candidate location.

According to various embodiments, the movement module 135 may move the electronic device 101 in a place based on a control signal of the processor 120. For example, the movement module 135 may include a wheel. The movement module 135 may include an acceleration sensor. The movement module 135 may obtain movement information including information regarding the movement distance, movement direction, movement speed, and movement acceleration speed of the electronic device 101 while moving the electronic device 101 in the place, and transmit the obtained movement information to the processor 120.

Figure 2:
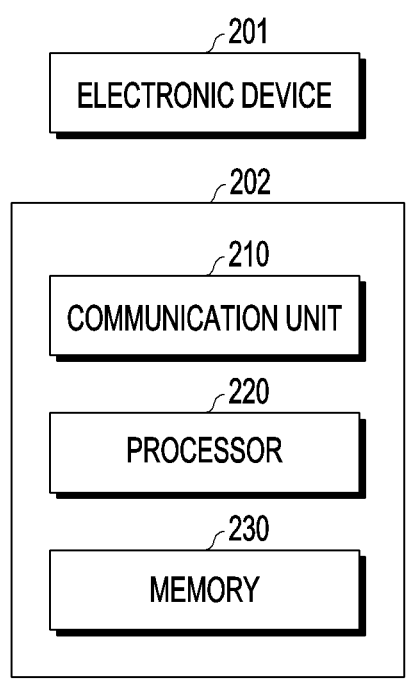
FIG. 2 is a block diagram of an electronic device according to various embodiments.

FIG. 2 is a block diagram of a server according to various embodiments.

As illustrated in FIG. 2, according to various embodiments, a server 202 may be a cloud server of FIG. 1 (e.g., the cloud server 102).

According to various embodiments, the server 202 may include a communication unit 210 configured to obtain, from the electronic device 201, movement information of the electronic device 201 and image information of a place where the electronic device 201 moves, a memory 230 having stored therein space information corresponding to the place where the electronic device 201 moves, and/or a processor 220 configured to receive, from the electronic device 201, a plurality of first candidate locations corresponding to the electronic device 201, to obtain a request for at least one second candidate location among the plurality of first candidate locations from the electronic device 201 through the communication unit 210, to determine the at least one second candidate location using the plurality of first candidate locations, the movement information, and the image information, and to transmit the at least one second candidate location to the electronic device 201.

Figure 3:
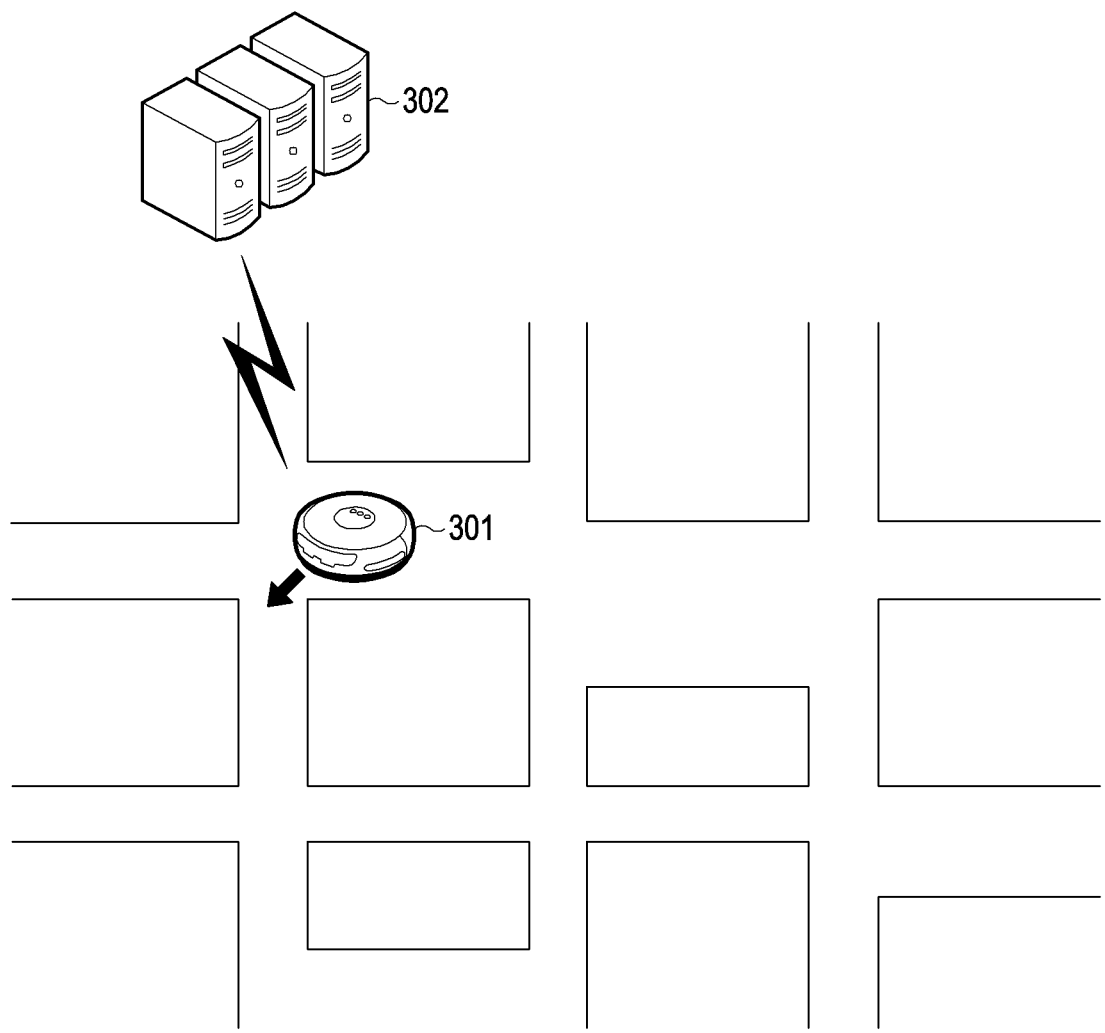
FIG. 3 is a block diagram of a programming module according to various embodiments.

FIG. 3 illustrates a place where a server and an electronic device are located according to various embodiments of the present disclosure.

As illustrated in FIG. 3, according to various embodiments, an electronic device 301 may move within a place using a movement module (e.g., the movement module 135) driven under control of a processor (e.g., the processor 120).

According to various embodiments, the electronic device 301 may send a request for second candidate locations to a server 302 while moving within the place, and receive the second candidate locations from the server 302 in response to the request.

Figure 4:
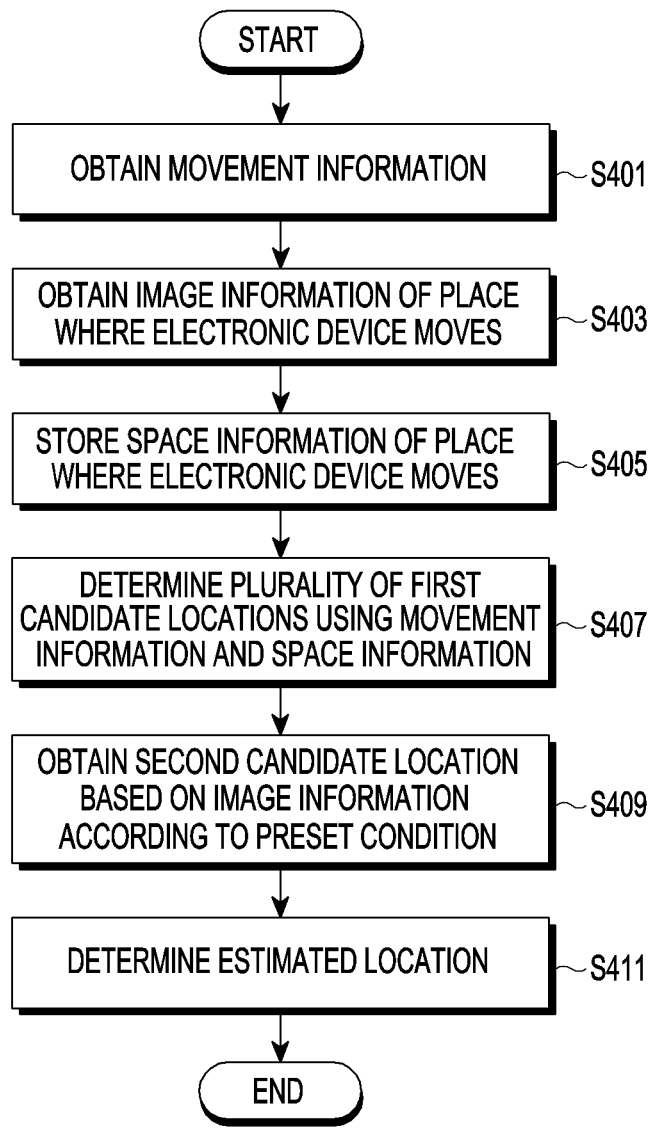
FIG. 4 is a flowchart illustrating a control method of an electronic device according to various embodiments.

FIG. 4 is a flowchart illustrating a control method of an electronic device according to various embodiments.

As illustrated in FIG. 4, according to various embodiments, in operation S401, a processor (e.g., the processor 120) of an electronic device (e.g., the electronic device 301)

may obtain movement information for the electronic device 301 using a movement module (e.g., the movement module 135).

According to various embodiments, in operation S403, the processor 120 may obtain image information of a place where the electronic device 301 moves, using a sensor module (e.g., the sensor modules 131, 132, 133, and 134).

According to various embodiments, in operation S405, the processor 120 may store, in a memory (e.g., the memory 140), space information of the place where the electronic device 301 moves.

According to various embodiments, in operation S407, the processor 120 may determine a plurality of first candidate locations indicating candidates for the location of the electronic device 301 in the space information (e.g., a map) of the place where the electronic device 301 moves, using the movement information and the space information.

According to various embodiments, in operation S409, the processor 120 may obtain at least one second candidate location among the plurality of first candidate locations based on the image information according to a preset condition using the electronic device 301 and/or the server 302.

For example, the processor 120 may calculate uncertainties of the plurality of first candidate locations. The processor 120 may calculate uncertainties of the plurality of first candidate locations using the image information. The processor 120 may compare each of the plurality of first candidate locations to the image information and determine the location accuracy for each of the plurality of first candidate locations based on the result of the comparison, and may calculate uncertainties of the plurality of first candidate locations based on the sum of location accuracies for the plurality of first candidate locations.

The processor 120 may obtain at least one second candidate location among the plurality of first candidate locations based on the uncertainties of the plurality of first candidate locations using one of the electronic device 301 and the server 302. When the uncertainties of the plurality of first candidate locations satisfy the preset condition, the processor 120 may obtain at least one second candidate location among the plurality of first candidate locations using the server 302. When the uncertainties of the plurality of first candidate locations do not satisfy the preset condition, the processor 120 may obtain at least one second candidate location among the plurality of first candidate locations using a processor (e.g., the processor 120) in the electronic device 301.

The processor 120 may calculate the uncertainty by determining whether a proportion of valid candidate locations among the plurality of first candidate locations is greater than or equal to a preset proportion. For example, the valid candidate location may include a candidate location in which the probability of the electronic device 301 existing in each of the plurality of first candidate locations (i.e., a location accuracy) is greater than or equal to a preset location accuracy value (i.e., a valid value). When the proportion of valid candidate locations to the plurality of first candidate locations is smaller than a preset proportion, the processor 120 may determine that the uncertainties of the plurality of first candidate locations are high (e.g., unreliable). When the proportion of the valid candidate locations to the plurality of first candidate locations is equal to or greater than the preset proportion, the processor 120 may determine that the uncertainties of the plurality of first candidate locations are low (e.g., reliable).

According to various embodiments, the at least one second location may include valid candidate locations of a proportion greater than or equal to the proportion of the valid candidate locations among the plurality of first candidate locations. That is, the processor 120 may obtain at least one second candidate location including the valid candidate locations of the proportion greater than or equal to the proportion of the valid candidate locations among the plurality of first candidate locations.

For example, the processor 120 may adjust a valid value based on network state information between the electronic device 301 and the server 302. When the network state between the electronic device 301 and the server 302 is poor, the processor 120 may increase the valid value such that the processor 120 may obtain the second candidate locations using the electronic device 301 in more cases, thereby preventing an excess of traffic in the network.

According to various embodiments, in operation S411, the processor 120 may determine an estimated location using the at least one second candidate location.

Figure 5:
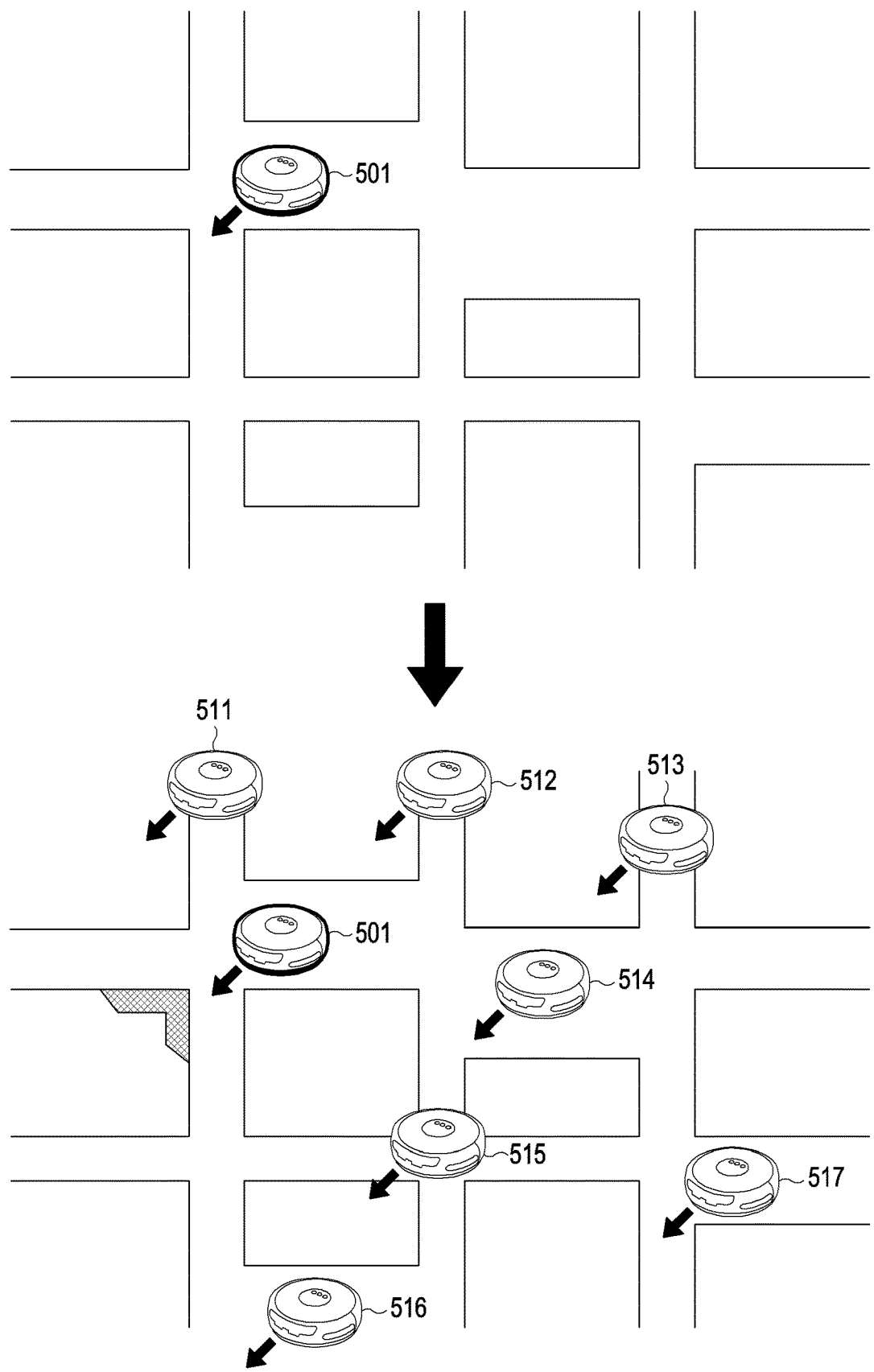
FIG. 5 illustrates an operation of determining a plurality of first candidate locations according to various embodiments.

FIG. 5 illustrates an operation of determining a plurality of first candidate locations according to various embodiments.

As illustrated in FIG. 5, for example, a processor (e.g., the processor 120) of an electronic device 501 may obtain movement information of the electronic device 501 from a movement module (e.g., the movement module 135) and determine a plurality of first candidate locations 511, 512, 513, 514, 515, 516, and 517 corresponding to the electronic device 501 using space information stored in a memory (e.g., the memory 140) and the movement information.

Figure 6:
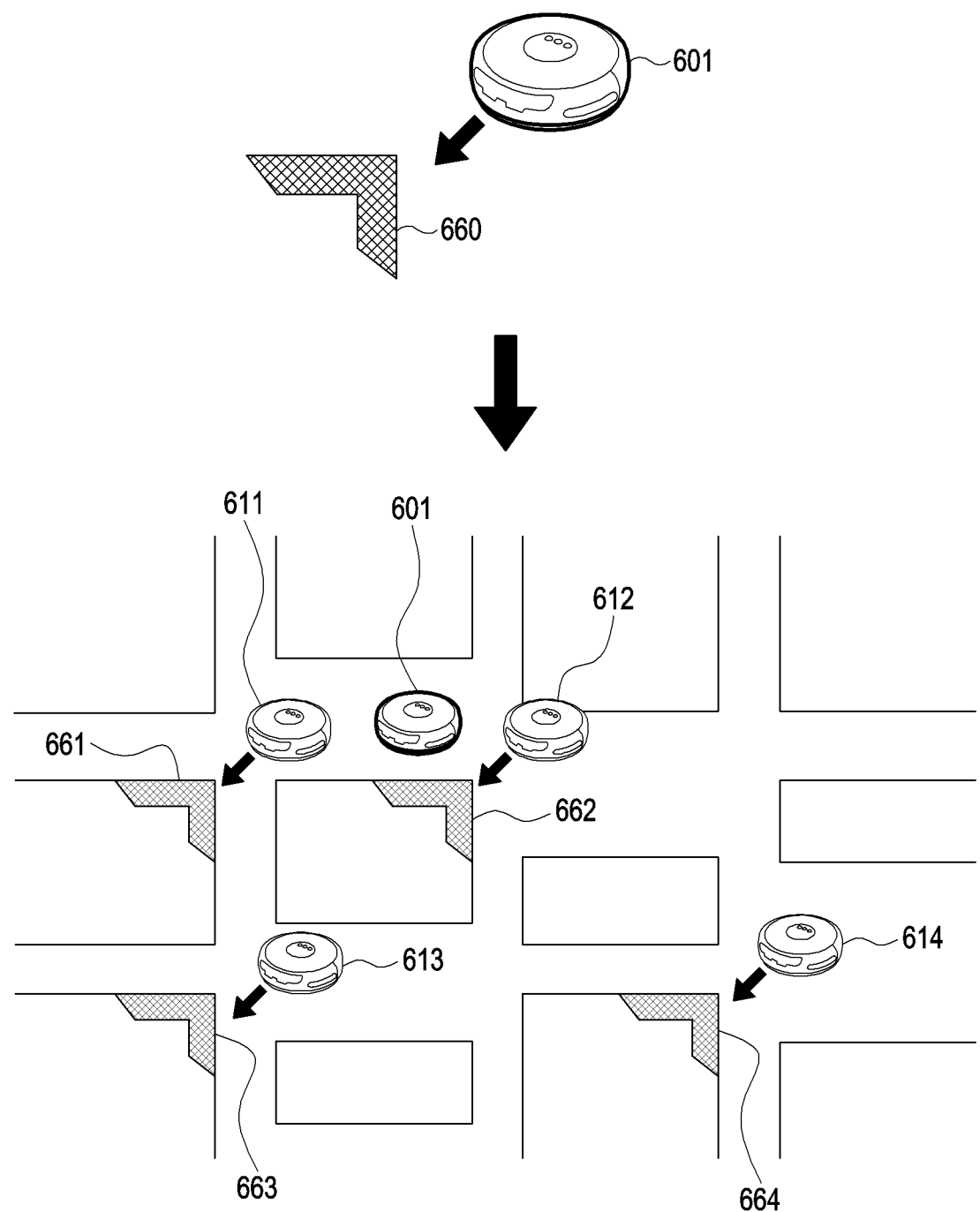
FIG. 6 illustrates an operation of obtaining at least one second candidate location according to various embodiments.

FIG. 6 illustrates an operation of obtaining at least one second candidate location according to various embodiments.

As illustrated in FIG. 6, for example, a camera sensor (e.g., the camera sensor 133) of an electronic device 601 may obtain image information 660 regarding an object in the periphery of the electronic device 601 and transmit the obtained image information 660 to a processor (e.g., the processor 120).

For example, the processor 120 may calculate uncertainties for a plurality of first candidate locations (e.g., the plurality of first candidate locations 511, 512, 513, 514, 515, 516, and 517) and obtain at least one of the second candidate locations 611, 612, 613, and 614 using results 661, 662, 663, and 664 of the comparison between the image information 660 and the plurality of first candidate locations 511, 512, 513, 514, 515, 516, and 517.

Figure 7:
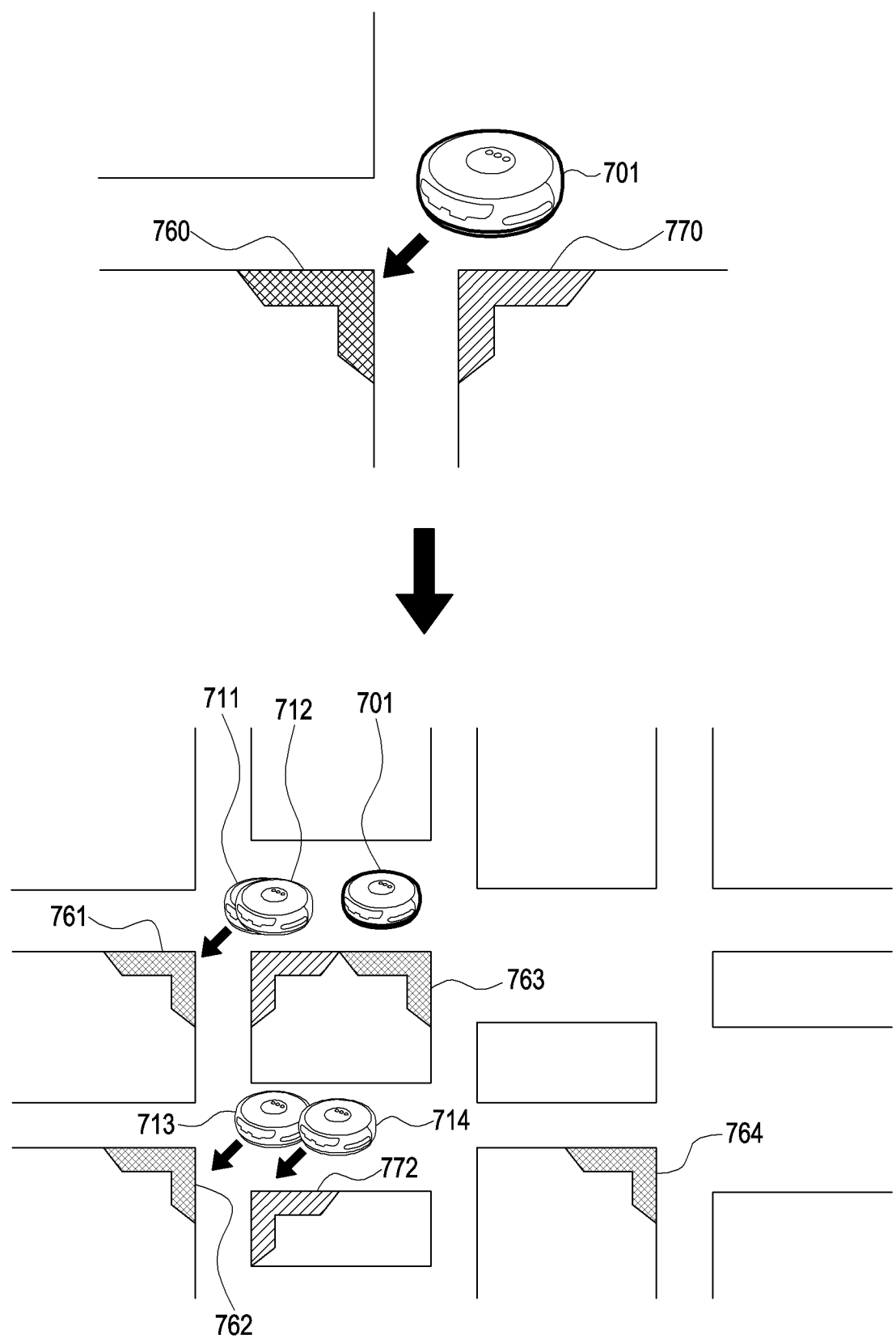
FIG. 7 illustrates an operation of obtaining at least one second candidate location according to various embodiments.

FIG. 7 illustrates an operation of obtaining at least one second candidate location according to various embodiments.

As illustrated in FIG. 7, for example, a camera sensor (e.g., the camera sensor 133) of an electronic device 701 may obtain first image information 760 regarding an object in the periphery of the electronic device 701 and/or second image information 770 regarding another object.

For example, a processor (e.g., the processor 120) may obtain at least one of the second candidate locations 711, 712, 713, and 714 using comparison results 761, 762, 763, 764, and 772 between a plurality of first candidate locations (e.g., the plurality of first candidate locations 511, 512, 513, 514, 515, 516, and 517) and the first image information 760 and/or the second image information 770.

Figure 8:
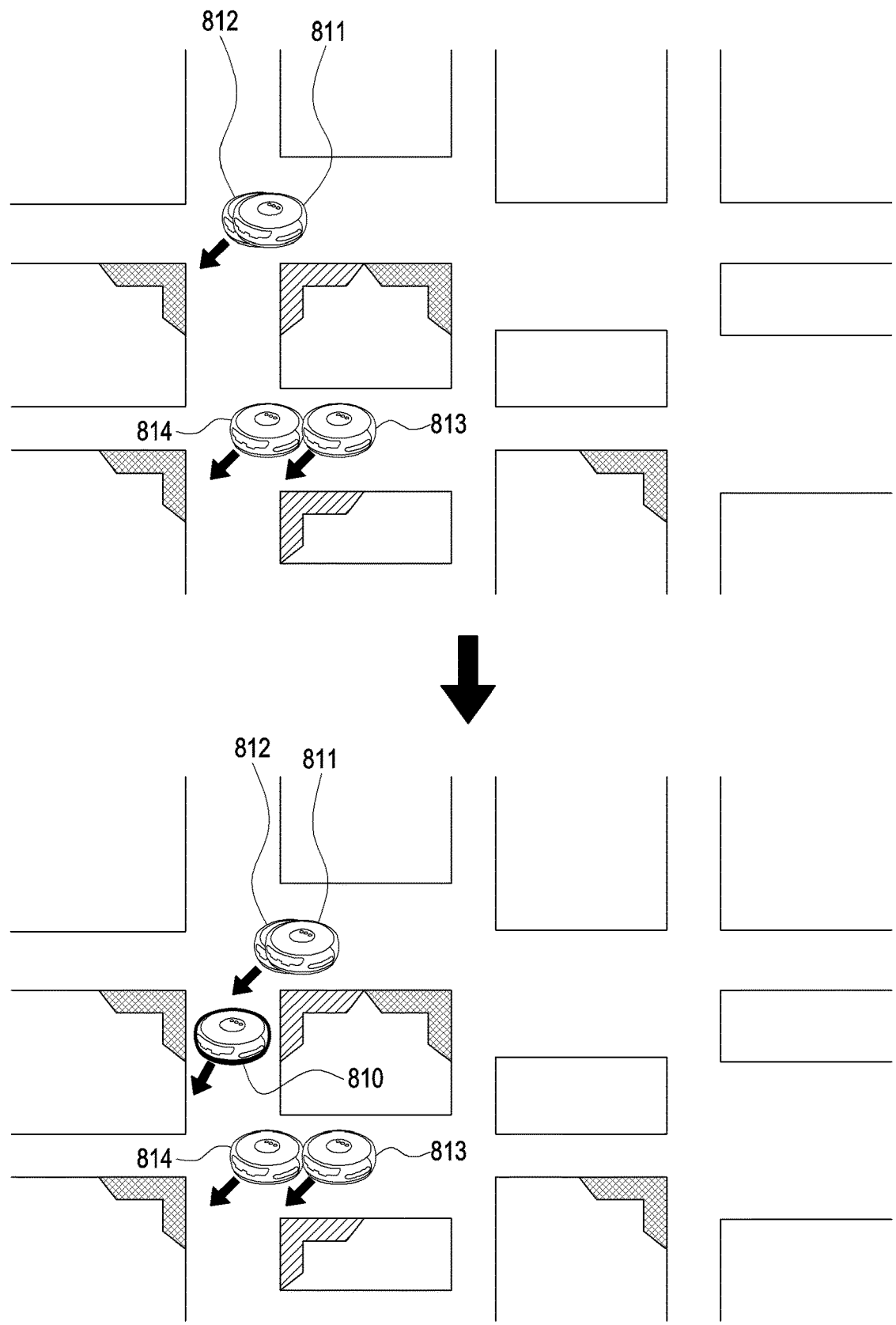
FIG. 8 illustrates an operation of determining an estimated location according to various embodiments.

FIG. 8 illustrates an operation of determining an estimated location according to various embodiments.

As illustrated in FIG. 8, for example, the processor (e.g., the processor 120) may determine an estimated location 810 of an electronic device using at least one of the second candidate locations 811, 812, 813, and 814.

Figure 9:
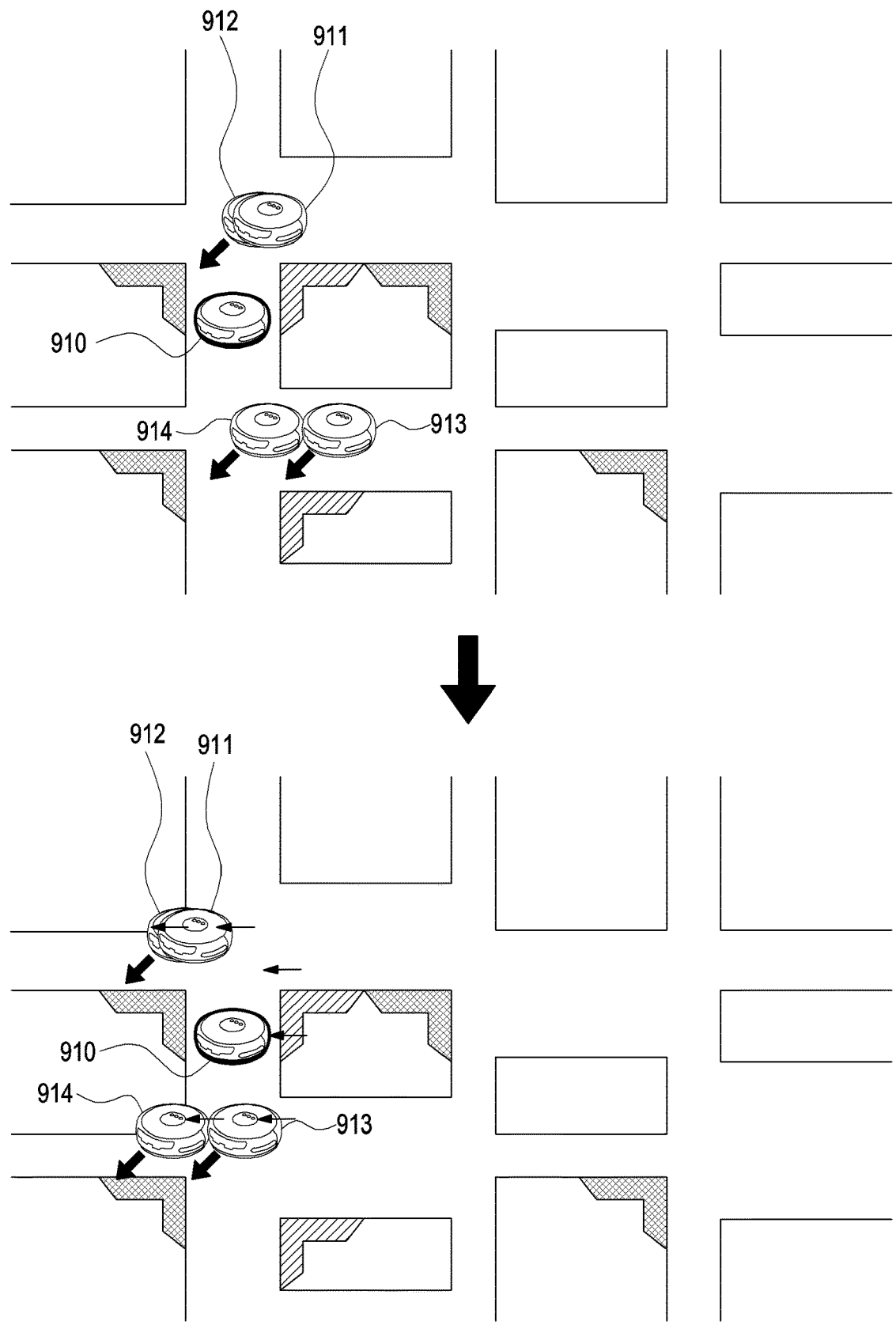
FIG. 9 illustrates an operation of moving candidate locations and an estimated location according to various embodiments.

FIG. 9 illustrates an operation of moving candidate locations and an estimated location according to various embodiments.

As illustrated in FIG. 9, for example, when an electronic device moves within a place, a processor (e.g., the processor 120) may move at least one of the second candidate locations 911, 912, 913, and 914 and/or an estimated location 910 in the space information based on movement information of the electronic device.

Figure 10:
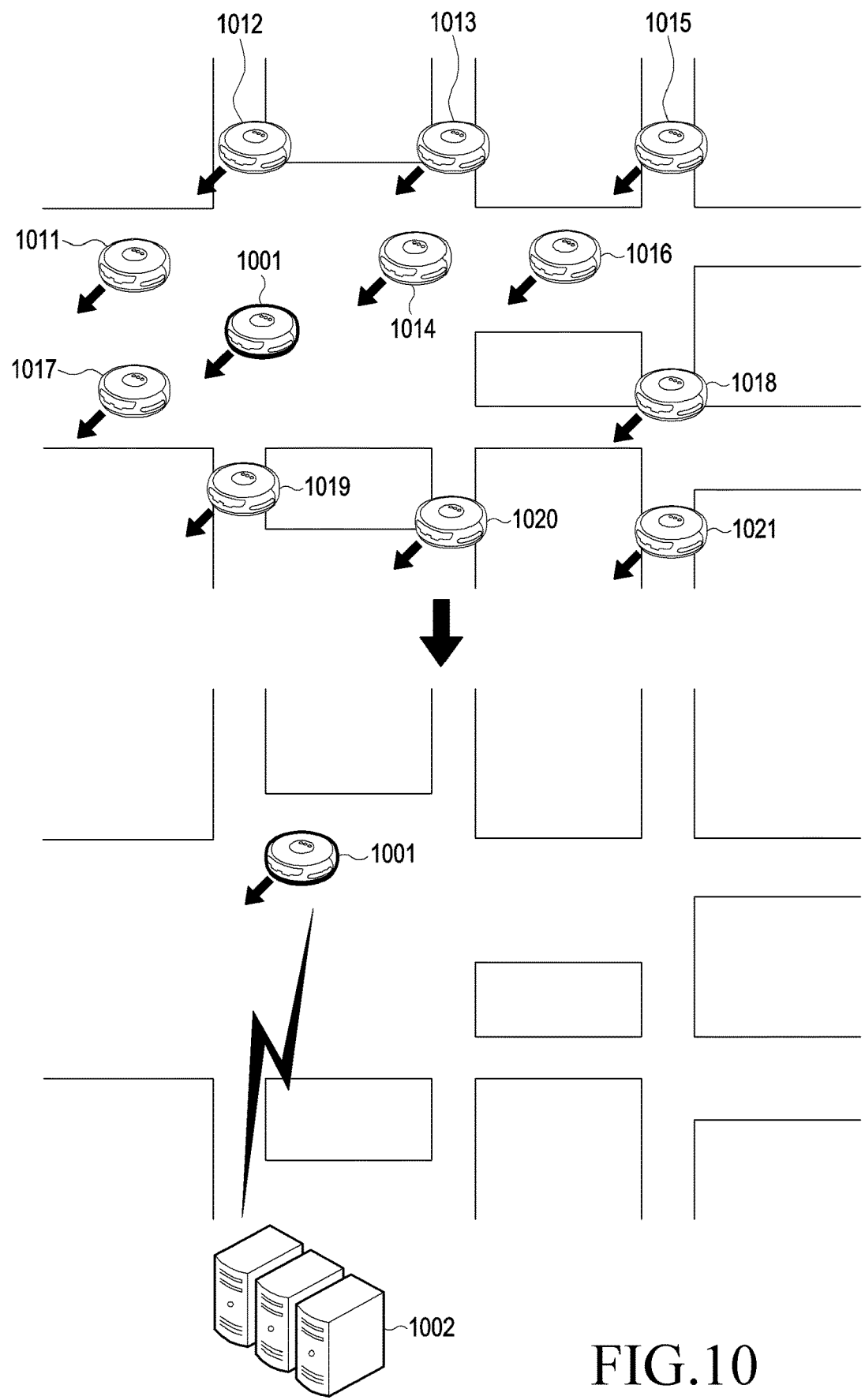
FIG. 10 illustrates an operation of obtaining a second candidate location based on uncertainty according to various embodiments.

FIG. 10 illustrates an operation of obtaining a second candidate location based on uncertainty according to various embodiments.

As illustrated in FIG. 10, for example, a processor (e.g., the processor 120) may determine uncertainties for a plurality of first candidate locations 1011, 1012, 1013, 1014, 1015, 1016, 1017, 1018, 1019, 1020, and 1021 corresponding to an electronic device 1001, and when the proportion of valid candidate locations among the plurality of first candidate locations 1011, 1012, 1013, 1014, 1015, 1016, 1017, 1018, 1019, 1020, and 1021 is smaller than a preset valid candidate location rate, the processor may send a request for at least one second candidate location to a server 1002.

Figure 11:
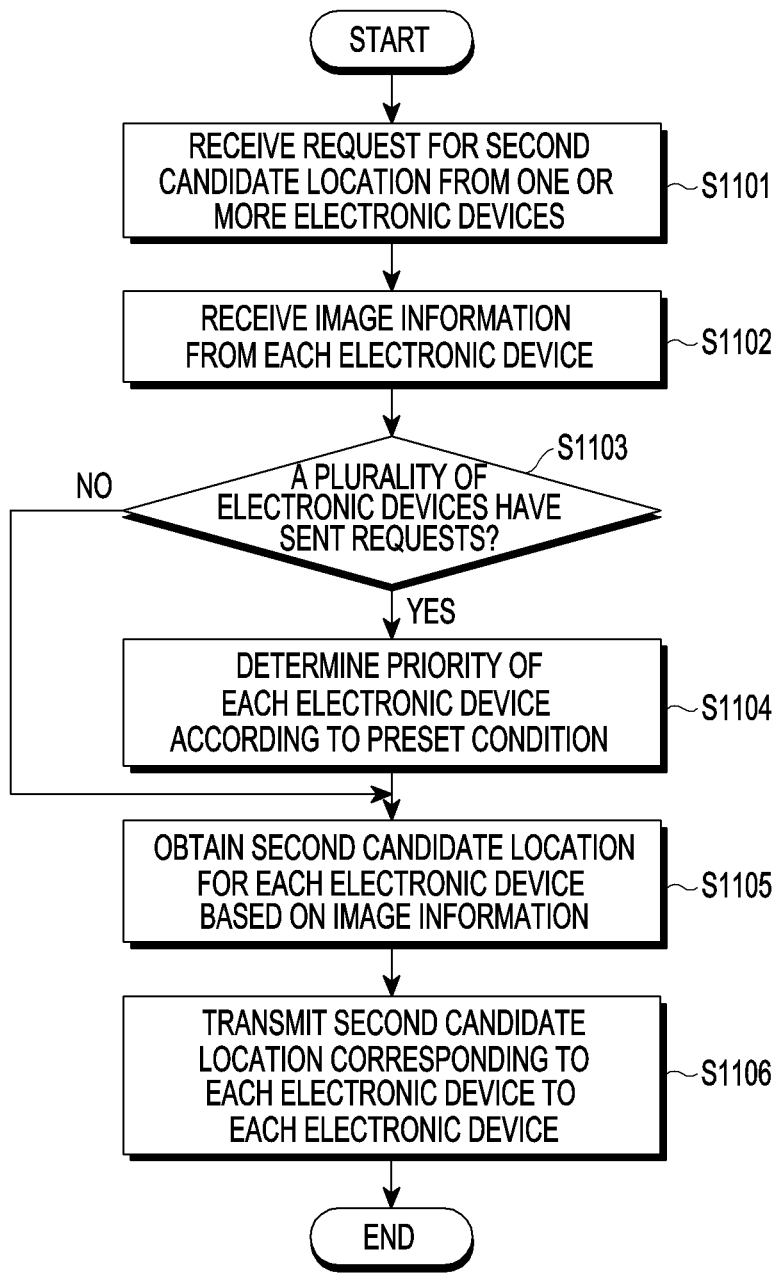
FIG. 11 is a flowchart illustrating a control method of a server according to various embodiments.

FIG. 11 is a flowchart illustrating a control method of a server according to various embodiments.

As illustrated in FIG. 11, according to various embodiments, in operation S1101, a communication unit of the server 1002 (e.g., the communication unit 210) may receive a request for a second candidate location from one or more electronic devices (e.g., the electronic device 1001).

According to various embodiments, in operation S1102, a processor (e.g., the processor 220) may receive image information from each electronic device 1001.

According to various embodiments, in operation S1103, the processor 220 may determine whether a plurality of electronic devices has sent the request.

For example, the processor 220 may receive the request from each electronic device 1001 using the communication unit 210, in which the request may include a request for at least one second candidate location among a plurality of first candidate locations corresponding to each electronic device.

A first electronic device among the one or more electronic devices may send a request for at least one second candidate location among a plurality of first candidate locations corresponding to the first electronic device to the server 1002, and at the same time, a second electronic device among the one or more electronic devices may send a request for at least one fourth candidate location among a plurality of third candidate locations corresponding to the second electronic device to the server 1002, in which the proportion of valid candidate locations with respect to the at least one fourth candidate location is greater than or equal to the proportion of valid candidate locations with respect to the plurality of third candidate locations.

According to various embodiments, in operation S1104, when a plurality of electronic devices has sent the request, the processor 220 may determine a priority for each electronic device 1001 according to a preset condition.

For example, the processor 220 may determine that a request received from an electronic device having a lower proportion of valid candidate locations among the plurality of first candidate locations of the first electronic device or the plurality of third candidate locations of the second electronic device has a high priority, select a request determined to have the highest priority, and determine the at least one of the second candidate locations or the at least one of the fourth candidate locations corresponding to the electronic device that sent the selected request.

When sending the requests to the server 1002, respectively, the first electronic device and the second electronic device may adjust the proportion of valid candidate locations among the plurality of first candidate locations corresponding to the first electronic device or the plurality of third candidate locations corresponding to the second electronic device based on information about a network state between each electronic device and the server 1002. The processor 220 of the server 1002 may compare the proportion of valid candidate locations, which have been adjusted based on the network state information between each electronic device and the server 1002, and determine based on a comparison result that the request received from the electronic device having the lower proportion of the valid candidate locations has higher priority.

When sending the requests to the server 1002, respectively, the first electronic device and the second electronic device may adjust the proportion of valid candidate locations among the plurality of first candidate locations corresponding to the first electronic device or the plurality of third candidate locations corresponding to the second electronic device based on a state (e.g., a complexity) of a space where each electronic device is located. For example, the processor 220 of the server 1002 may compare the proportion of valid candidate locations, which have been adjusted based on the state (e.g., the complexity) of the space where each electronic device is located, and determine based on a comparison result that the request received from the electronic device having the lower proportion of the valid candidate locations has higher priority.

According to various embodiments, the processor 220 may obtain a second candidate location corresponding to each electronic device 1001 based on the image information in operation S1105, and may transmit the second candidate location corresponding to each electronic device 1001 to each electronic device 1001 in operation S1106.

Figure 12:
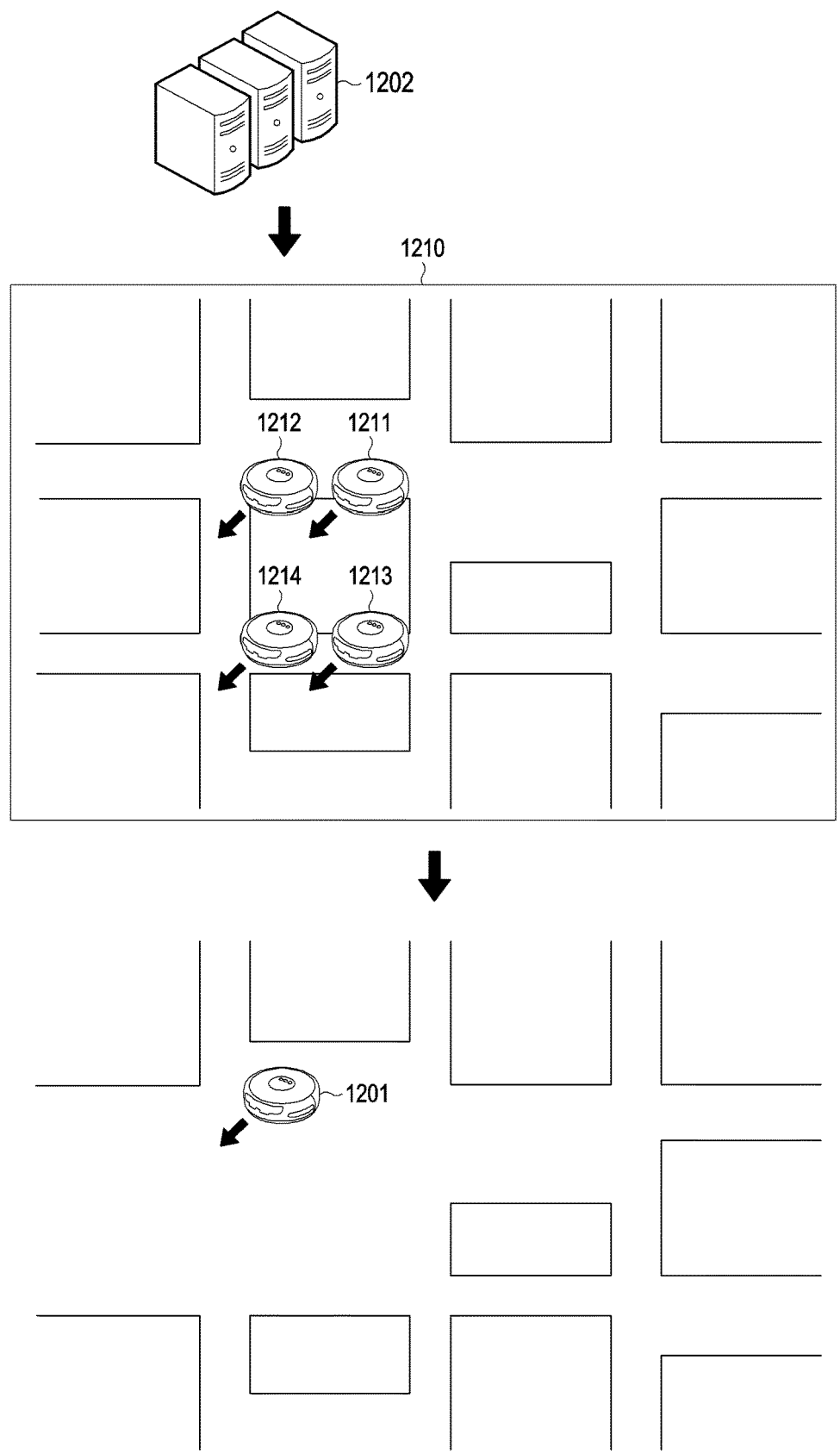
FIG. 12 illustrates an operation of transmitting, by a sever, second candidate locations according to various embodiments.

FIG. 12 illustrates an operation of transmitting, by a server, second candidate locations according to various embodiments.

As illustrated in FIG. 12, for example, a server 1202 may obtain at least one of the second candidate locations 1211, 1212, 1213, and 1214 in space information 1210 regarding a place where an electronic device 1201 moves, in response to a request sent from the electronic device 1201.

For example, the server 1202 may transmit at least one of the second candidate locations 1211, 1212, 1213, and 1214 to the electronic device 1201.

Figure 13:
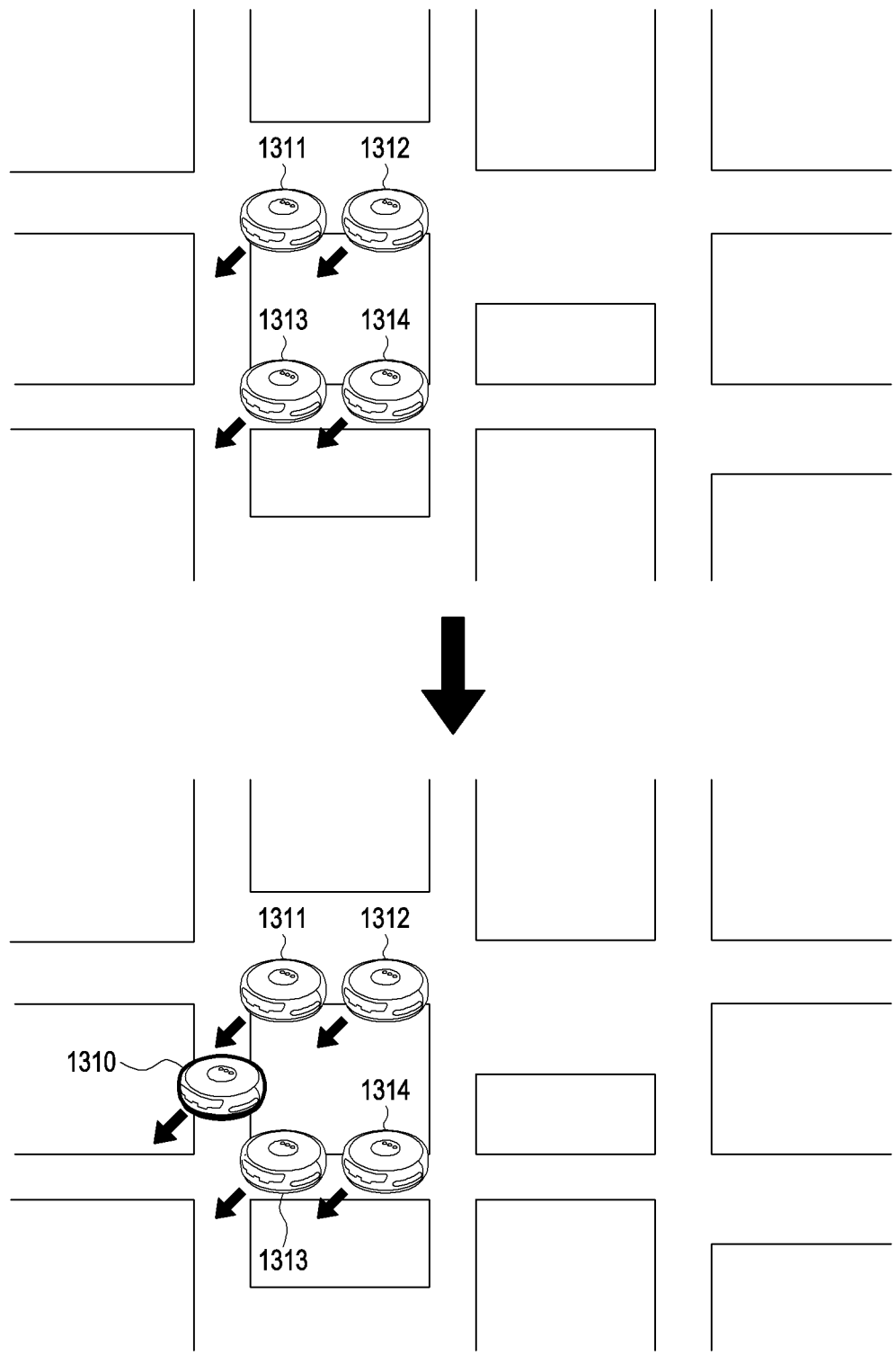
FIG. 13 illustrates an operation of estimating, by an electronic device, a location according to various embodiments.

FIG. 13 illustrates an operation of estimating, by an electronic device, a location according to various embodiments.

As illustrated in FIG. 13, for example, a processor (e.g., the processor 120) of an electronic device (e.g., the electronic device 1201) may determine the estimated location 1310 of the electronic device 1201 using at least one of the second candidate locations 1311, 1312, 1313, and 1314 transmitted from a server (e.g., the server 1202).

Figure 14:
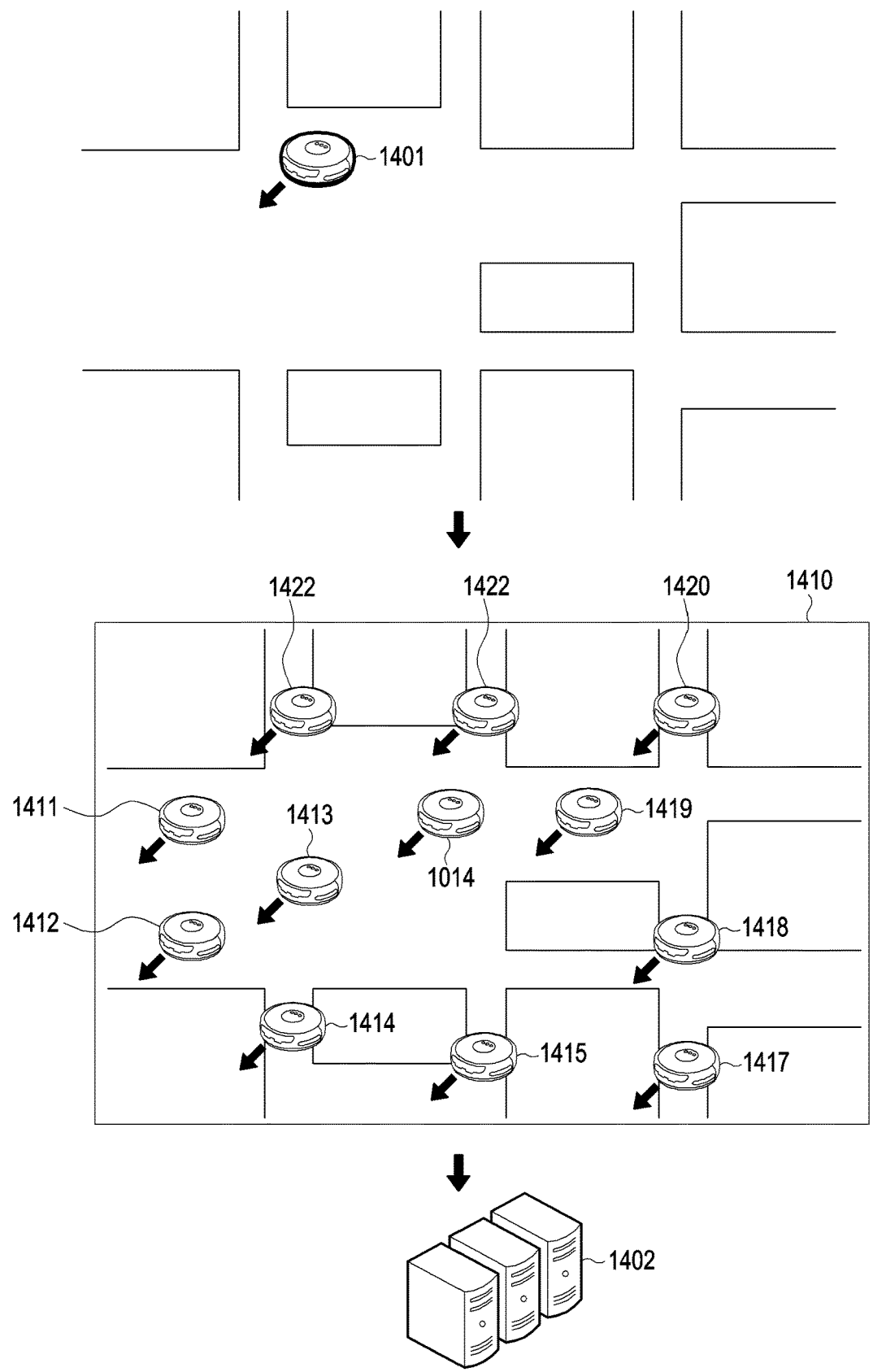
FIG. 14 illustrates an electronic device that transmits first candidate locations to a server according to various embodiments.

FIG. 14 illustrates an electronic device that transmits first candidate locations to a server according to various embodiments.

As illustrated in FIG. 14, for example, the processor (e.g., the processor 120) of the electronic device 1401 may transmit a plurality of first candidate locations 1411, 1412, 1413, 1414, 1415, 1416, 1417, 1418, 1419, 1420, 1421, and 1422 in space information 1410 to a server 1402.

Figure 15:
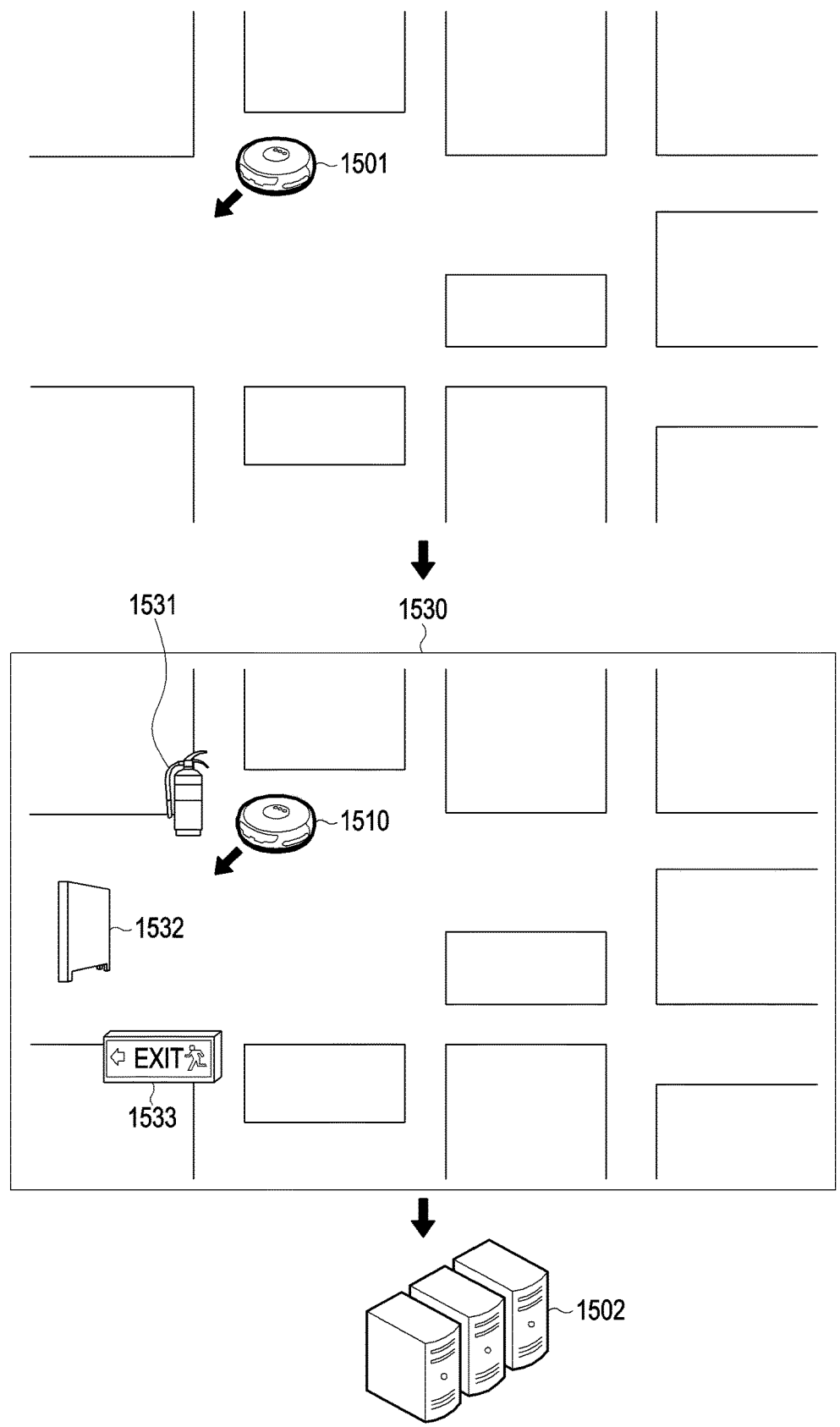
FIG. 15 illustrates an electronic device that transmits landmark information to a server according to various embodiments.

FIG. 15 illustrates an electronic device that transmits landmark information to a server according to various embodiments.

As illustrated in FIG. 15, for example, a processor (e.g., the processor 120) of an electronic device 1501 may transmit landmark information 1531, 1532, and 1533 in the periphery of first candidate locations 1510 obtained by a sensor module (e.g., the sensor modules 131, 132, 133, and 134) of an electronic device 1501 in space information 1530 to a server 1502.

Figure 16:
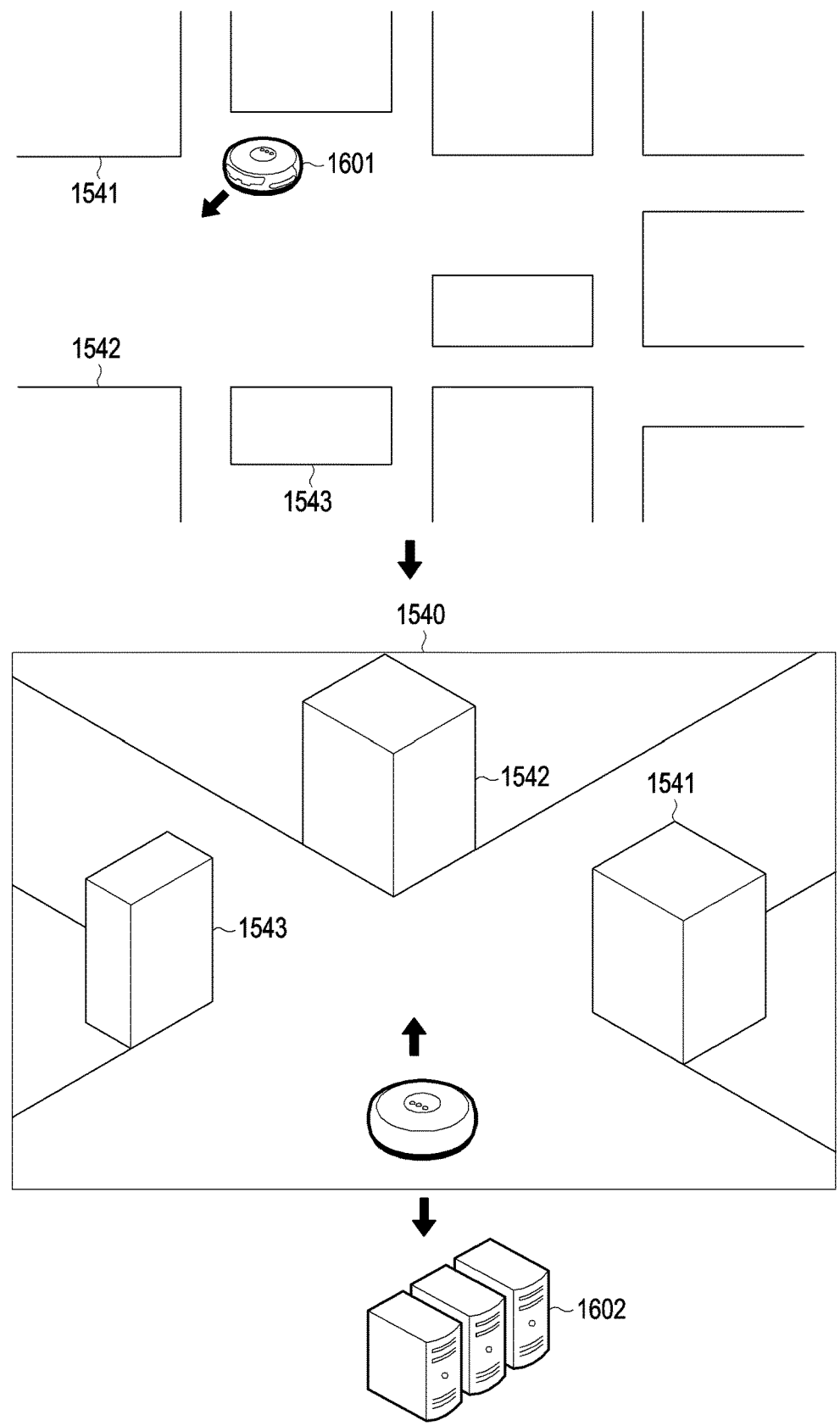
FIG. 16 illustrates an electronic device that transmits three-dimensional (3D) recognition information to a server according to various embodiments.

FIG. 16 illustrates an electronic device that transmits three-dimensional (3D) recognition information to a server according to various embodiments.

As illustrated in FIG. 16, for example, a processor (e.g., the processor 120) of an electronic device 1601 may transmit 3D recognition information 1541, 1542, and 1543 in the periphery of an electronic device 1601 obtained by a sensor module (e.g., the sensor modules 131, 132, 133, and 134) in space information 1540 to a server 1602.

Figure 17:
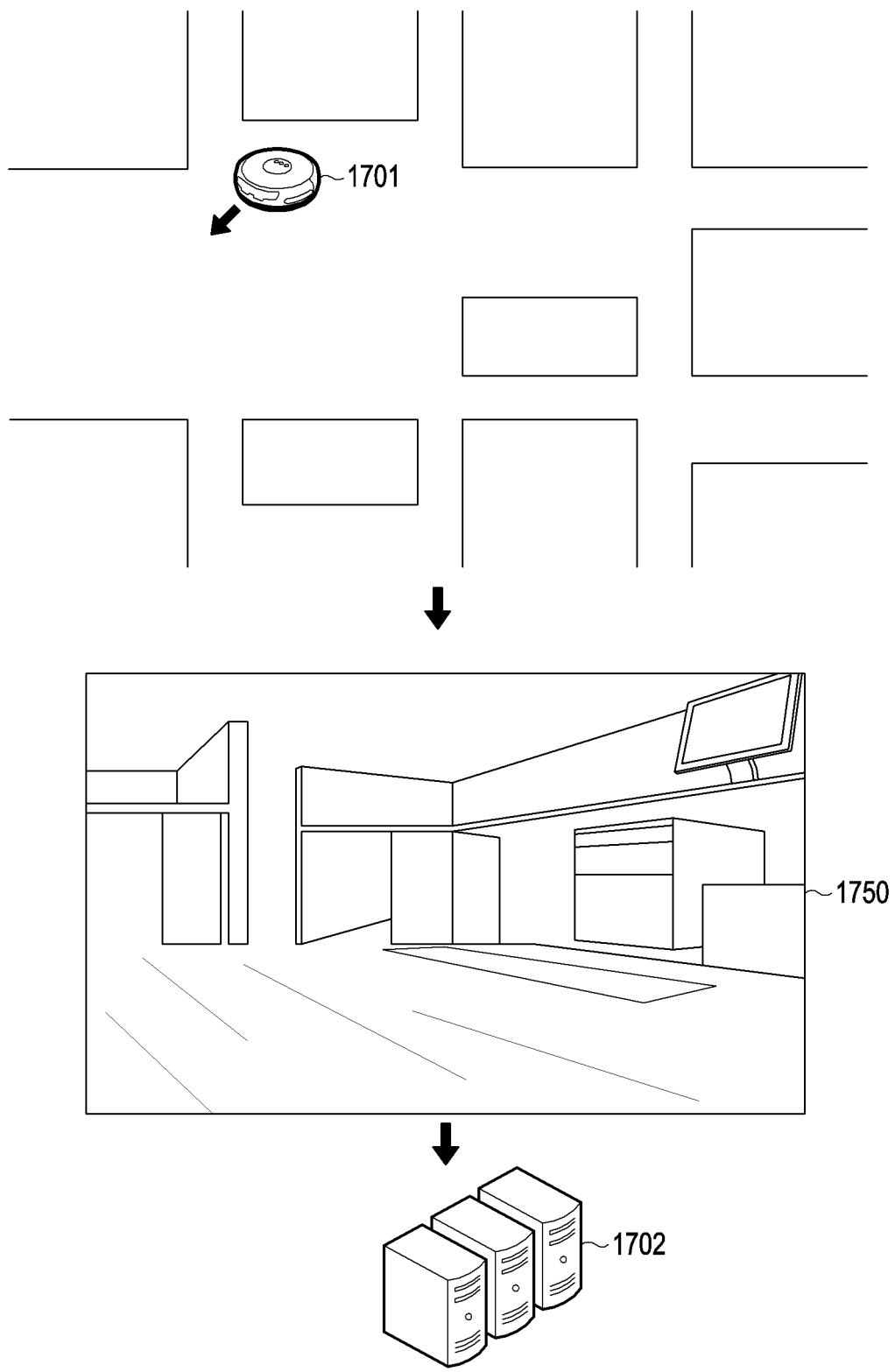
FIG. 17 illustrates an electronic device that transmits image information to a server according to various embodiments.

FIG. 17 illustrates an electronic device that transmits image information to a server according to various embodiments.

As illustrated in FIG. 17, for example, a processor (e.g., the processor 120) of an electronic device 1701 may transmit image information 1750 in the periphery of an electronic device 1701 obtained by a sensor module (e.g., the sensor modules 131, 132, 133, and 134) in space information to a server 1702.

Figure 18:
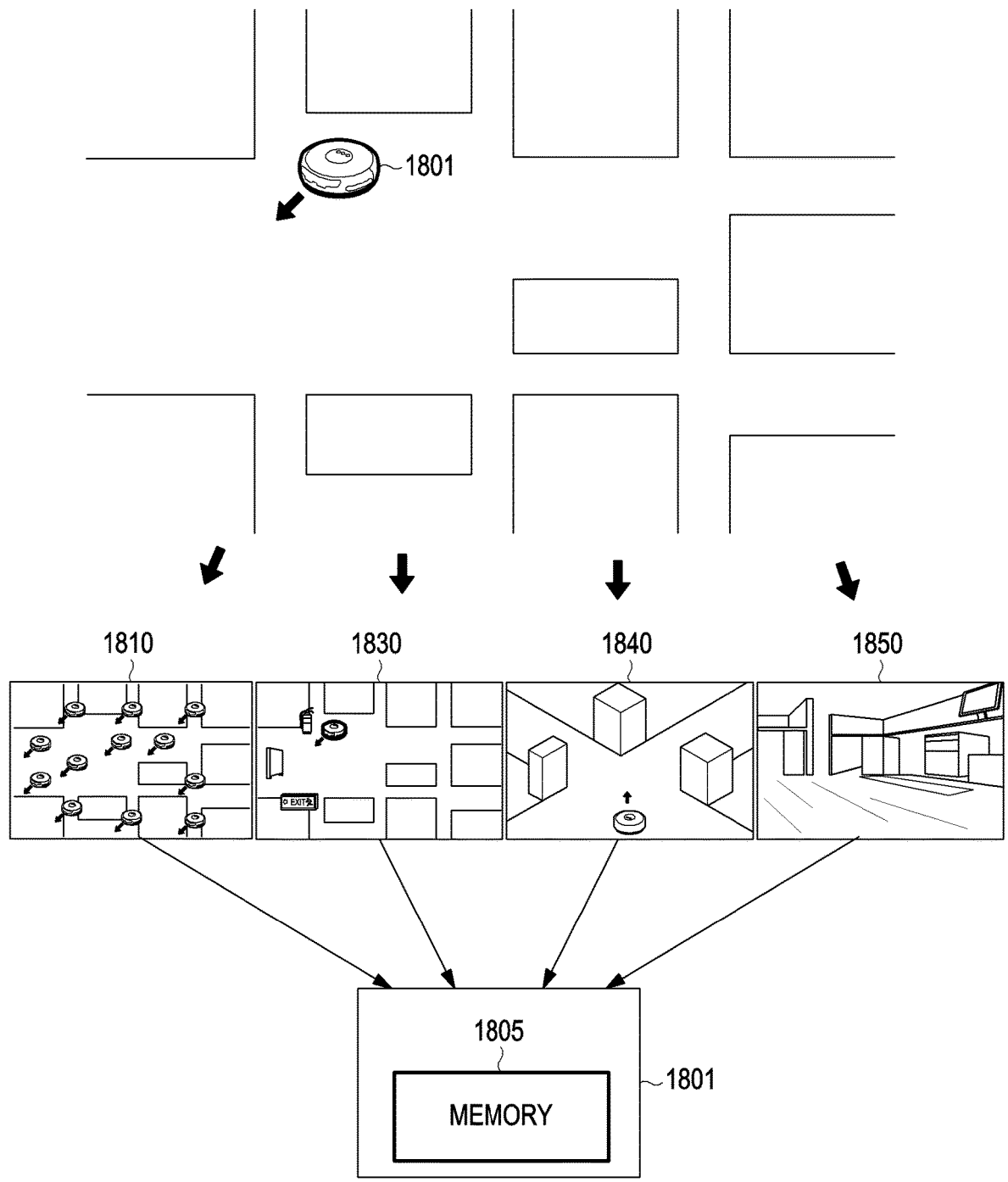
FIG. 18 illustrates a memory of a server according to various embodiments.

FIG. 18 illustrates a memory of a server according to various embodiments.

As illustrated in FIG. 18, for example, a server 1801 may receive a plurality of first candidate locations 1810, landmark information 1830, 3D recognition information 1840, and/or image information 1850 transmitted from an electronic device 1801, and store the received plurality of first candidate locations 1810, the received landmark information 1830, the received 3D recognition information 1840, and/or the received image information 1850 in a memory 1805.

Figure 19:
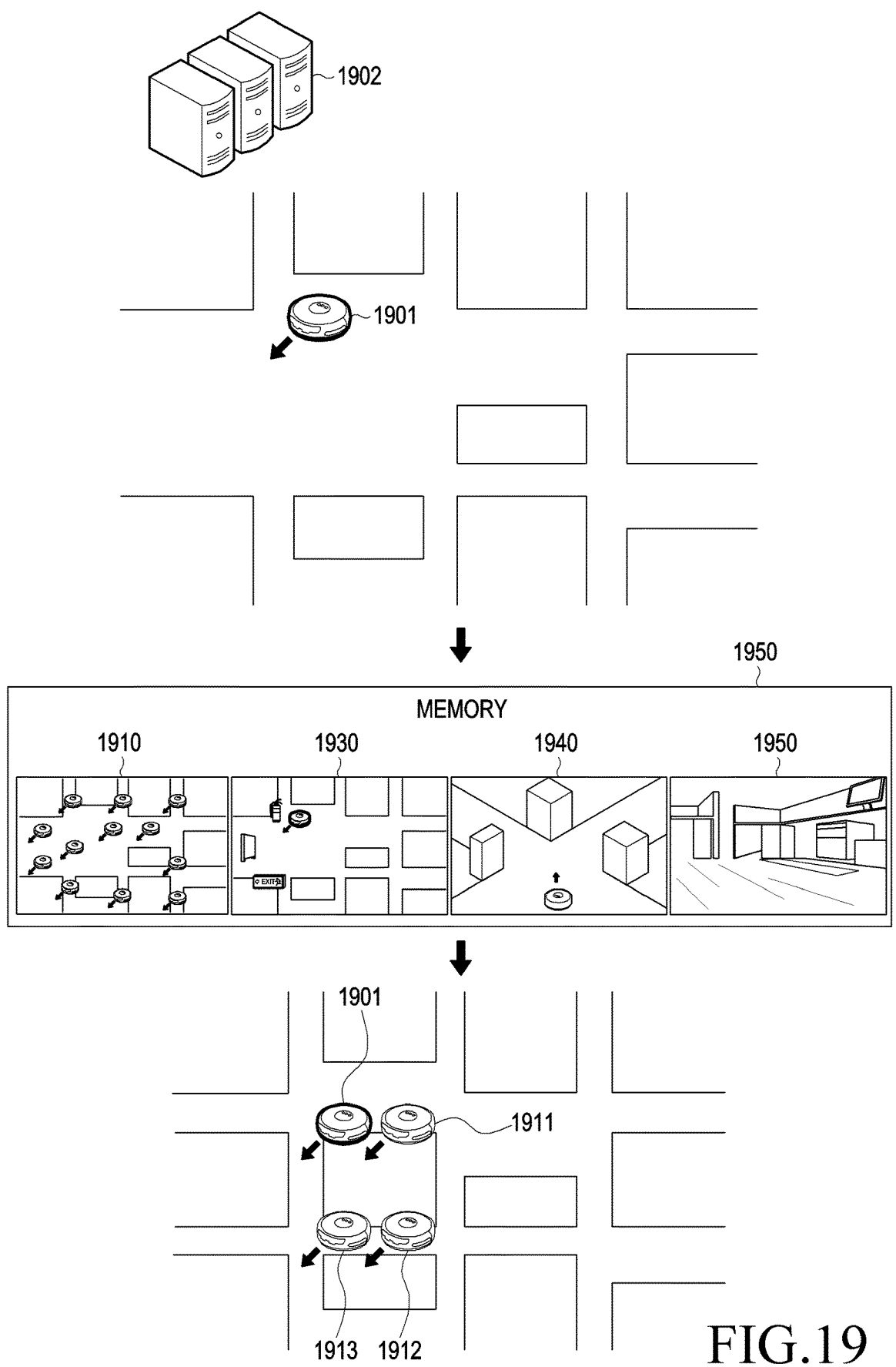
FIG. 19 illustrates a server that determines a second candidate location according to various embodiments.

FIG. 19 illustrates a server that determines a second candidate location according to various embodiments.

As illustrated in FIG. 19, for example, when receiving a request for at least one second candidate location from an electronic device 1901, a processor (e.g., the processor 220) of a server 1902 may obtain at least one of the second candidate locations 1911, 1912, and 1913 using a plurality of first candidate locations 1910, landmark information 1930, 3D recognition information 1940, and/or image information 1950 that are stored in a memory 1905.

Figure 20:
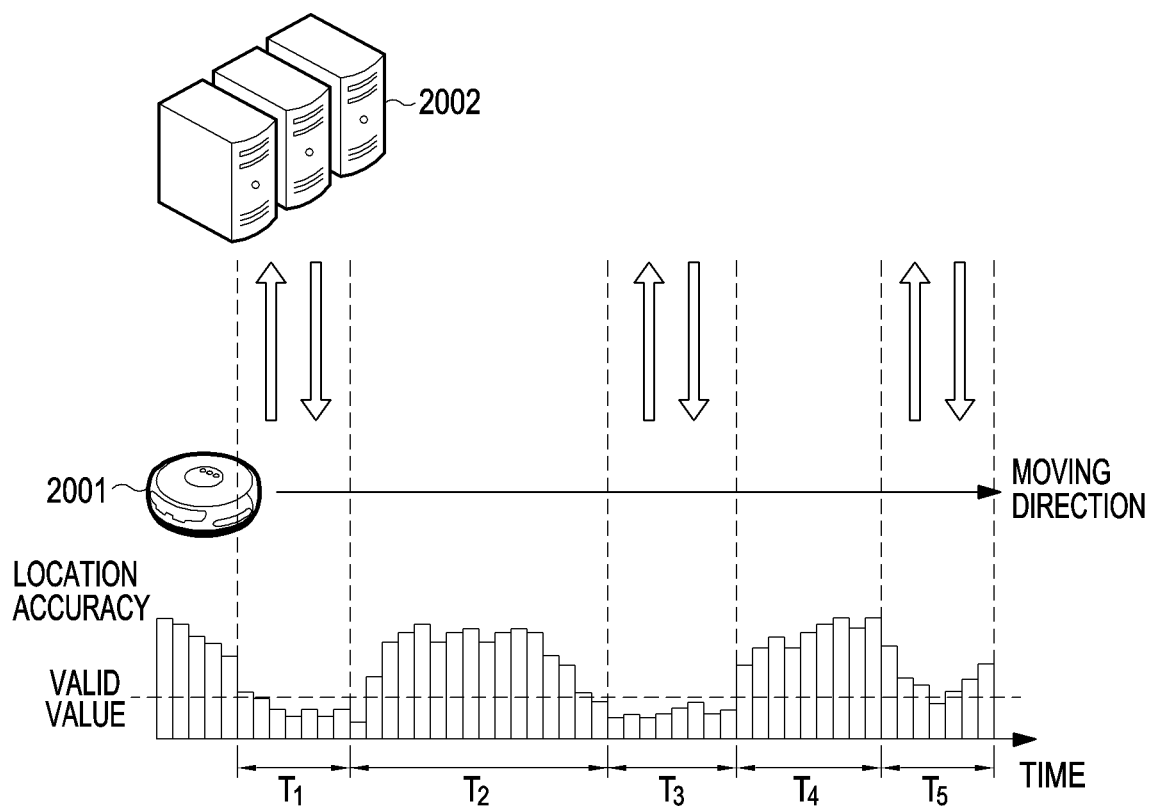
FIG. 20 illustrates an operation of controlling a server and an electronic device based on location accuracy of second candidate locations according to various embodiments.

FIG. 20 illustrates an operation of controlling a server and an electronic device based on location accuracy of second candidate locations according to various embodiments.

As illustrated in FIG. 20, for example, a processor (e.g., the processor 120) of an electronic device 2001 may determine a plurality of first candidate locations corresponding to the electronic device 2001, calculate the sum of location accuracies of the plurality of first candidate locations, and determine whether the sum of the location accuracies is greater than or equal to a preset valid value.

For example, for periods $T_1$, $T_3$, and $T_5$ where the sum of the location accuracies of the plurality of first candidate locations is smaller than the preset valid value, the processor 120 may obtain at least one second candidate location using a server 2002.

For example, for periods $T_2$ and $T_4$ where the sum of the location accuracies of the plurality of first candidate locations is greater than or equal to the preset valid value, the processor 120 may obtain at least one second candidate location within the electronic device 2001 in place of the server 2002 using the electronic device 2001.

Figure 21A:
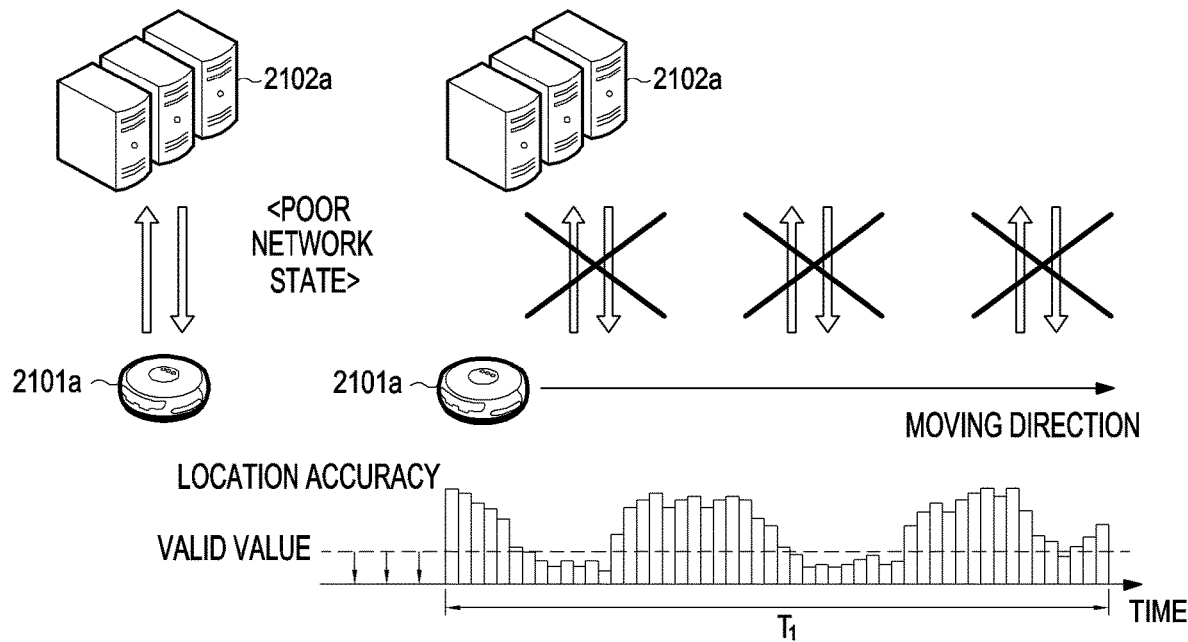
FIGS. 21A and 21B illustrate an operation of controlling a server and an electronic device based on a network state between the server and the electronic device according to various embodiments.
Figure 21B:
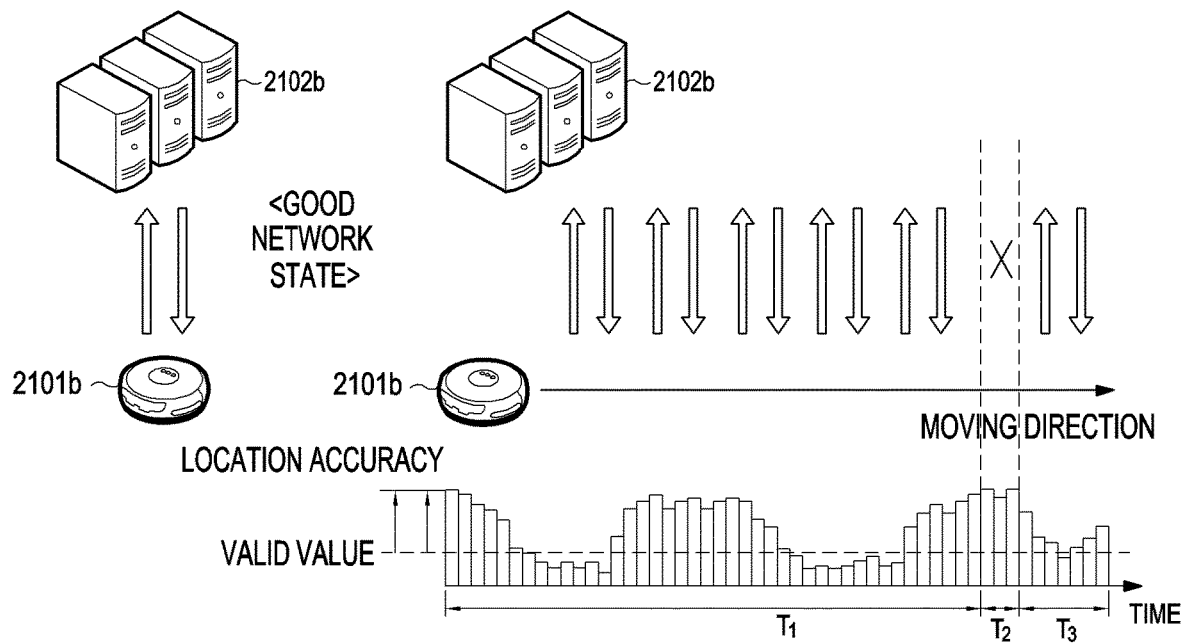

FIGS. 21(a) and 21(b) illustrate an operation of controlling a server and an electronic device based on a network state between the server and the electronic device according to various embodiments.

As illustrated in FIG. 21(a), for example, when determining that a network state between a server 2102a and an electronic device 2101a is poor, a processor (e.g., the processor 120) may lower the preset valid value for location accuracy, such that a sum of location accuracies of a plurality of first candidate locations exceeds a valid value over the entire period $T_1$ in the graph shown in FIG. 21(a), and thus the processor may obtain at least one second candidate location within the electronic device 2101a in place of the server 2102a using the electronic device 2101a during the entire period $T_1$.

As illustrated in FIG. 21(b), for example, when determining that a network state between a server 2102b and an electronic device 2101b is good, a processor (e.g., the processor 120) may raise the preset valid value for location accuracy, such that the processor may obtain at least one second candidate location within the electronic device 2101b in place of the server 2102b using the electronic device 2101b during a period $T_2$ in the graph shown in FIG. 21(b) because a sum of location accuracies of a plurality of first candidate locations exceeds a valid value over the period $T_2$, and may obtain at least one of the second candidate locations using the server 2102b during periods $T_1$ and $T_3$ because the sum of the location accuracies of the plurality of first candidate locations does not exceed the valid value during the periods $T_1$ and $T_3$.

FIG. 22 illustrates an operation of controlling a server and an electronic device based on the map state of a place where the electronic device is located according to various embodiments.

Figure 22A:
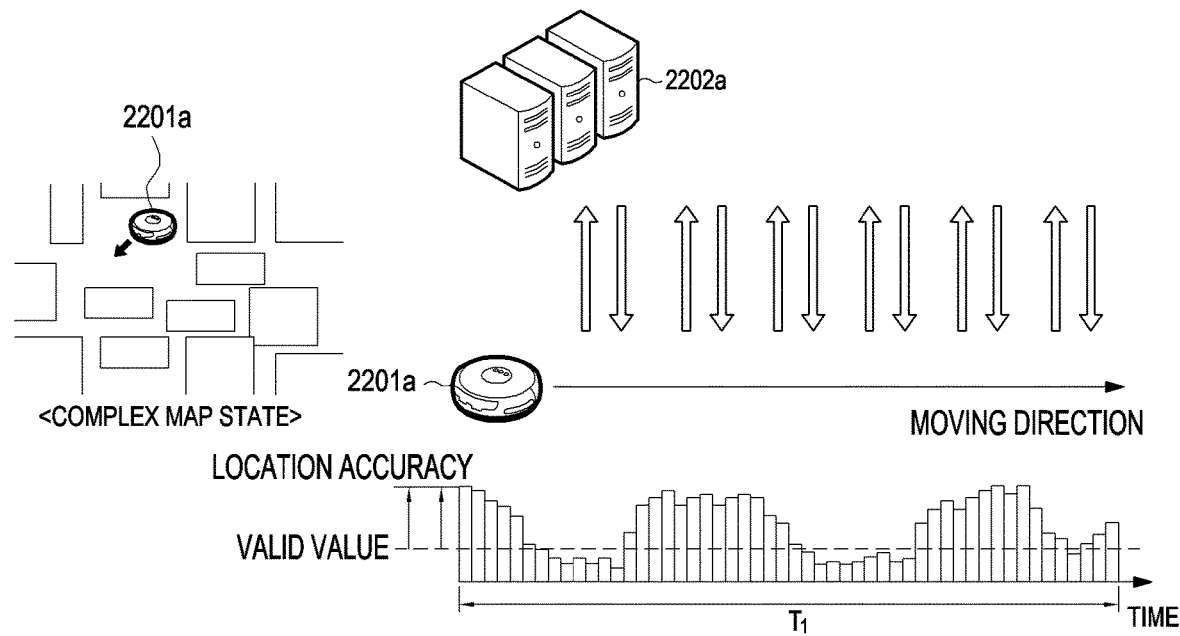
FIGS. 22A and 22B illustrate an operation of controlling a server and an electronic device based on a map state of a place where the electronic device is located according to various embodiments.

As illustrated in FIG. 22(a), for example, when determining that the state of a map (e.g., space information) corresponding to a place where an electronic device 2201a is located is complex, a processor (e.g., the processor 120) may raise the preset valid value for location accuracy, such that a sum of location accuracies of a plurality of first candidate locations exceeds a valid value over the entire period $T_1$ in a graph shown in FIG. 22(a), and thus the processor may obtain at least one second candidate location using a server 2202a during the entire period $T_1$.

Figure 22B:
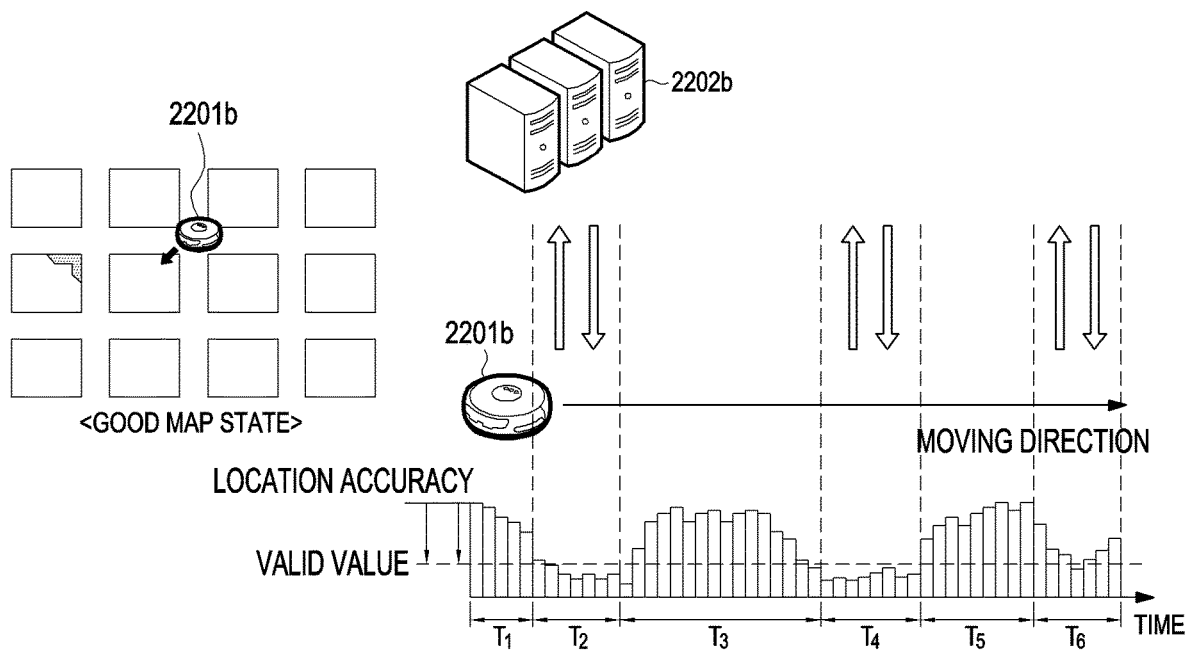

As illustrated in FIG. 22(b), for example, when determining that the state of a map corresponding to a place where an electronic device 2201b is located is good, a processor (e.g., the processor 120) may lower the preset valid value for a location accuracy, such that the processor may obtain at least one second candidate location using a server 2202b during periods $T_2$, $T_4$, and $T_6$ in the graph shown in FIG. 22(b) because the sum of location accuracies of a plurality of first candidate locations does not exceed a valid value over periods $T_2$, $T_4$, and $T_6$, and may obtain at least one of the second candidate locations using the electronic device 2201b in place of the server 2202b during periods $T_1$, $T_3$, and $T_5$ because the sum of the location accuracies of the plurality of first candidate locations exceeds the valid value during periods $T_1$, $T_3$, and $T_5$.

An electronic device, according to various embodiments of the present disclosure, may include a communication module, a sensor module configured to obtain movement information of the electronic device and image information of a place where the electronic device moves, a memory having stored therein space information corresponding to the place where the electronic device moves, and a processor configured to determine a plurality of first candidate locations corresponding to the electronic device in the place using the movement information and the space information, to determine based on the image information and the plurality of first candidate locations whether location accuracies corresponding to the plurality of first candidate locations are smaller than a valid value, to obtain at least one second candidate location from among the plurality of first candidate locations using any one of the electronic device and an external server based on a result of the determination, and to determine an estimated location of the electronic device using the obtained at least one second candidate location.

According to various embodiments, the processor may be further configured to obtain the at least one second candidate location from among the plurality of first candidate locations using the image information.

According to various embodiments, the processor may be further configured to determine the proportion of valid candidate locations among the plurality of first candidate locations and to obtain the at least one second candidate location using the external server when the proportion of the valid candidate locations is smaller than a preset proportion.

According to various embodiments, the first valid candidate proportion of valid candidate locations included in the at least one of the second candidate locations may be greater than or equal to the second valid candidate proportion of valid candidate locations included in the plurality of first candidate locations.

According to various embodiments, the processor may be further configured to adjust the valid value based on information regarding a network state between the electronic device and the external server.

According to various embodiments, the processor may be further configured to adjust the valid value based on the uncertainty calculation history of the electronic device.

According to various embodiments, the processor may be further configured to adjust the valid value based on a state of the space information.

An external server, according to various embodiments of the present disclosure, may include a communication unit configured to obtain movement information of a first electronic device and image information of a place where the first electronic device moves, a memory having stored therein space information corresponding to the place where the first electronic device moves, and a processor configured to receive a plurality of first candidate locations corresponding to the first electronic device from the first electronic device using the communication unit, to determine at least one second candidate location after obtaining a request for the at least one second candidate location among the plurality of first candidate location from the first electronic device, and to transmit the at least one second candidate location to the first electronic device.

According to various embodiments, the processor may be further configured to determine priorities of a first request and a second request based on a preset condition and select the first request or the second request based on the determined priorities, after obtaining the second request for at least one fourth candidate location among a plurality of third candidate locations corresponding to a second electronic device from the second electronic device while obtaining the first request for the at least one second candidate location from the first electronic device.

According to various embodiments, the processor may be further configured to determine the proportion of valid candidate locations among the plurality of first candidate locations and the proportion of valid candidate locations among the plurality of third candidate locations and to determine the priorities of the first request and the second request based on the determined proportion of the valid candidate locations.

A control method of an electronic device, according to various embodiments of the present disclosure, may include obtaining movement information of the electronic device, obtaining image information of a place where the electronic device moves, determining a plurality of first candidate locations corresponding to the electronic device in a place using the movement information of the electronic device and pre-stored space information corresponding to the place where the electronic device moves, determining based on the image information and the plurality of first candidate locations whether location accuracies corresponding to the plurality of first candidate locations are smaller than a valid value, obtaining at least one second candidate location from among the plurality of first candidate locations based on a result of the determination using any one of the electronic device and an external server, and determining an estimated location of the electronic device using the obtained at least one second candidate location.

According to various embodiments, the method may further include obtaining the at least one second candidate location from among the plurality of first candidate locations using the image information.

According to various embodiments, the method may further include determining the proportion of valid candidate locations among the plurality of first candidate locations and obtaining the at least one second candidate location using the external server when the proportion of the valid candidate locations is smaller than a preset proportion.

According to various embodiments, the first valid candidate proportion of valid candidate locations included in the at least one of the second candidate locations may be greater than or equal to the second valid candidate proportion of valid candidate locations included in the plurality of first candidate locations.

According to various embodiments, the method may further include adjusting the valid value based on information regarding a network state between the electronic device and the external server.

According to various embodiments, the method may further include adjusting the valid value based on the uncertainty calculation history of the electronic device.

According to various embodiments, the method may further include adjusting the valid value based on the state of the space information.

A control method of an external server, according to various embodiments of the present disclosure, may include obtaining movement information of a first electronic device and image information of a place where the first electronic device moves, storing space information corresponding to the place where the first electronic device moves, receiving a plurality of first candidate locations corresponding to the first electronic device from the first electronic device, determining at least one second candidate location after obtaining a request for the at least one second candidate location among the plurality of first candidate location from the first electronic device, and transmitting the at least one second candidate location to the first electronic device.

According to various embodiments, the method may further include obtaining a second request for at least one fourth candidate location among a plurality of third candidate locations corresponding to a second electronic device from the second electronic device while obtaining a first request for the at least one second candidate location from the first electronic device, determining priorities of the first request and the second request based on a preset condition, and selecting the first request or the second request based on the determined priorities.

According to various embodiments, the method may further include determining the proportion of valid candidate locations among the plurality of first candidate locations and the proportion of valid candidate locations among the plurality of third candidate locations and determining the priorities of the first request and the second request based on the determined proportion of the valid candidate locations.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium may include a hard disk, a floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., read only memory (ROM), random access memory (RAM), flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations. The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
   a communication module;
   a sensor module comprising at least one first sensor configured to obtain movement information of the electronic device and at least one second sensor configured to obtain image information of a place where the electronic device moves;
   a memory having stored therein space information corresponding to the place where the electronic device moves; and
   a processor configured to;
      determine a plurality of first candidate locations, which are candidates for a location of the electronic device in the place, using the movement information and the space information,
      determine, based on the image information and the plurality of first candidate locations, whether a sum of probabilities of the electronic device being in each of the plurality of first candidate locations is smaller than a defined first accuracy value,
      based on the sum of probabilities of the electronic device being in each of the plurality of first candidate locations being smaller than the defined first accuracy value, obtain at least one second candidate location from among the plurality of first candidate locations from an external server,
      based on the sum of probabilities of the electronic device being in each of the plurality of first candidate locations being greater than or equal to the defined first accuracy value, obtain, by calculating, the at least one second candidate location from among the plurality of first candidate locations, and
      determine an estimated location of the electronic device using the obtained at least one second candidate location.

2. The electronic device of claim 1, wherein the processor is further configured to obtain the at least one second candidate location from among the plurality of first candidate locations using the image information.

3. The electronic device of claim 1, wherein the processor is further configured to:
   determine a proportion of valid candidate locations among the plurality of first candidate locations, wherein the proportion of valid candidate locations is a proportion of a number of valid candidate locations to a number of the plurality of first candidate locations, and probability of the electronic device being in a valid candidate location is greater than or equal to a defined second accuracy value; and
   obtain the at least one second candidate location using the external server when the proportion of the valid candidate locations is smaller than a defined proportion.

4. The electronic device of claim 3, wherein a first valid candidate proportion of valid candidate locations included in the at least one second candidate locations is greater than or equal to a second valid candidate proportion of valid candidate locations included in the plurality of first candidate locations.

5. The electronic device of claim 1, wherein the processor is further configured to adjust the defined first accuracy value based on information regarding a network state between the electronic device and the external server.

6. The electronic device of claim 5, wherein the processor is further configured to adjust the defined first accuracy value based on an uncertainty calculation history of the electronic device.

7. The electronic device of claim 5, wherein the processor is further configured to adjust the defined first accuracy value based on a state of the space information.

8. An external server comprising:
a communication circuit configured to obtain movement information of a first electronic device and image information of a place where the first electronic device moves;
a memory having stored therein space information corresponding to the place where the first electronic device moves; and
a processor configured to;
receive a plurality of first candidate locations, which are candidates for a location of the first electronic device, from the first electronic device using the communication circuit,
determine at least one second candidate location after obtaining a request for the at least one second candidate location among the plurality of first candidate locations from the first electronic device based, on the electronic device determining a sum of probabilities of the electronic device being in each of the plurality of first candidate locations is smaller than a defined first accuracy value, and
transmit the at least one second candidate location to the first electronic device.

9. The external server of claim 8, wherein the processor is further configured to;
after obtaining a second request for at least one fourth candidate location among a plurality of third candidate locations, which are candidates for a location of a second electronic device, from the second electronic device while obtaining a first request for the at least one second candidate location from the first electronic device,
determine a proportion of valid candidate locations among the plurality of first candidate locations and a proportion of valid candidate locations among the plurality of third candidate locations, wherein the proportion of valid candidate locations is a proportion of a number of the valid candidate locations to a number of the plurality of first candidate locations, and probability of the electronic device being in a valid candidate location is greater than or equal to a defined second accuracy value,
based on the proportion of valid candidate locations among the plurality of first candidate locations being greater than the proportion of valid candidate locations among the plurality of third candidate locations, determine that priority of the first request is lower than priority of the second request,
based on the proportion of valid candidate locations among the plurality of first candidate locations being smaller than the proportion of valid candidate locations among the plurality of third candidate locations, determine that priority of the first request is higher than priority of the second request.

10. A control method of an electronic device, the method comprising:
obtaining movement information of the electronic device;
obtaining image information of a place where the electronic device moves;
determining a plurality of first candidate locations, which are candidates for a location of the electronic device, in the place using the movement information of the electronic device and pre-stored space information corresponding to the place where the electronic device moves;
determining, based on the image information and the plurality of first candidate locations, whether a sum of probabilities of the electronic device being in each of the plurality of first candidate locations is smaller than a defined first accuracy value;
based on the sum of probabilities of the electronic device being in each of the plurality of first candidate locations being smaller than the defined first accuracy value, obtaining at least one second candidate location from among the plurality of first candidate locations based on a result of the determination from an external server;
based on a sum of probabilities of the electronic device being in each of the plurality of first candidate locations being greater than or equal to the defined first accuracy value, obtaining, by calculating, the at least one second candidate location from among the plurality of first candidate locations; and
determining an estimated location of the electronic device using the obtained at least one second candidate location.

11. The method of claim 10, further comprising:
determining a proportion of valid candidate locations among the plurality of first candidate locations, wherein probability of the electronic device being in a valid candidate location is greater than or equal to a defined second accuracy value; and
obtaining the at least one second candidate location using the external server when the proportion of the valid candidate locations is smaller than a defined proportion.

12. A control method of an external server, the method comprising:
obtaining movement information of a first electronic device and image information of a place where the first electronic device moves;
storing space information corresponding to the place where the first electronic device moves;
receiving a plurality of first candidate locations, which are candidates for a location of the first electronic devices from the first electronic device;
determining at least one second candidate location after obtaining a request for the at least one second candidate location among the plurality of first candidate locations from the first electronic device, based on the electronic device determining a sum of probabilities of the electronic device being in each of the plurality of first candidate locations is smaller than a defined first accuracy value; and
transmitting the at least one second candidate location to the first electronic device.

13. The method of claim 12, further comprising:
obtaining a second request for at least one fourth candidate location among a plurality of third candidate locations, which are candidates for a location of a second electronic device, from the second electronic device while obtaining a first request for the at least one second candidate location from the first electronic device;
determining a proportion of valid candidate locations among the plurality of first candidate locations and a proportion of valid candidate locations among the plurality of third candidate locations, wherein the proportion of valid candidate locations is a proportion of a number of the valid candidate locations to a number of the plurality of first candidate locations, and probability of the electronic device being in a valid candidate location is greater than or equal to a defined second accuracy value;

based on the proportion of valid candidate locations among the plurality of first candidate locations being greater than the proportion of valid candidate locations among the plurality of third candidate locations, determine that priority of the first request is lower than priority of the second request; and based on the proportion of valid candidate locations among the plurality of first candidate locations being smaller than the proportion of valid candidate locations among the plurality of third candidate locations, determine that priority of the first request is higher than priority of the second request.

14. The method of claim 10, further comprising obtaining the at least one second candidate location from among the plurality of first candidate locations using the image information.

15. The method of claim 11, wherein a first valid candidate proportion of valid candidate locations included in the at least one second candidate locations is greater than or equal to a second valid candidate proportion of valid candidate locations included in the plurality of first candidate locations.

16. The method of claim 10, further comprising adjusting the defined first value based on information regarding a network state between the electronic device and the external server.

17. The method of claim 10, further comprising adjusting the defined first value based on an uncertainty calculation history of the electronic device.

18. The method of claim 10, further comprising adjusting the defined first value based on a state of the space information.

* * * * *